United States Patent
McAllister et al.

(10) Patent No.: US 8,159,349 B2
(45) Date of Patent: Apr. 17, 2012

(54) SECURE MODULAR APPLICATORS TO COMMISSION WIRELESS SENSORS

(75) Inventors: Clarke William McAllister, Eugene, OR (US); Timothy Mintzer, Aumsville, OR (US)

(73) Assignee: ADASA Inc., Eugene, OR (US)

( * ) Notice: Subject to any disclaimer, the term of this patent is extended or adjusted under 35 U.S.C. 154(b) by 0 days.

(21) Appl. No.: 12/891,959

(22) Filed: Sep. 28, 2010

(65) Prior Publication Data
US 2011/0018689 A1    Jan. 27, 2011

Related U.S. Application Data

(63) Continuation-in-part of application No. 11/465,712, filed on Aug. 18, 2006, now Pat. No. 7,830,258, and a continuation-in-part of application No. 11/767,471, filed on Jun. 22, 2007, now abandoned.

(60) Provisional application No. 60/709,713, filed on Aug. 19, 2005, provisional application No. 60/805,777, filed on Jun. 26, 2006.

(51) Int. Cl.
*G08B 13/14* (2006.01)

(52) U.S. Cl. .............. 340/572.1; 340/10.51; 340/572.8; 340/693.5

(58) Field of Classification Search .... 340/572.1–572.9, 340/10.1–10.6, 693.5
See application file for complete search history.

(56) References Cited

U.S. PATENT DOCUMENTS

| | | | |
|---|---|---|---|
| 5,227,617 A | 7/1993 | Christopher |
| 5,280,159 A | 1/1994 | Schultz |
| 5,850,187 A | 12/1998 | Carrender |
| 5,874,902 A | 2/1999 | Heinrich |
| 6,025,780 A | 2/2000 | Bowers |
| 6,078,251 A | 6/2000 | Landt |
| 6,181,248 B1 | 1/2001 | Fockens |
| 6,246,326 B1 | 6/2001 | Wiklof |
| 6,279,638 B1 | 8/2001 | Goodwin |
| 6,280,544 B1 | 8/2001 | Fox |
| 6,317,028 B1 | 11/2001 | Valiulis |
| 6,332,098 B2 | 12/2001 | Ross |
| 6,379,058 B1 | 4/2002 | Petteruti |
| 6,409,401 B1 | 6/2002 | Petteruti |
| 6,415,978 B1 | 7/2002 | Mcallister |
| 6,478,229 B1 | 11/2002 | Epstein |
| 6,481,907 B2 | 11/2002 | Banach |
| 6,486,780 B1 | 11/2002 | Garber |
| 6,517,700 B2 | 2/2003 | Byszewski |
| 6,532,346 B2 | 3/2003 | Gallivan |
| 6,677,852 B1 | 1/2004 | Landt |
| 6,805,183 B2 | 10/2004 | Goodwin |
| 6,848,616 B2 | 2/2005 | Tsirline |
| 6,857,714 B2 | 2/2005 | Hohberger |
| 6,884,312 B2 | 4/2005 | Mitchell |
| 6,899,476 B1 | 5/2005 | Barrus |
| 6,933,848 B1 | 8/2005 | Stewart |
| 6,963,351 B2 | 11/2005 | Squires |
| 6,995,652 B2 | 2/2006 | Carrender |

(Continued)

*Primary Examiner* — Thomas Mullen
(74) *Attorney, Agent, or Firm* — Peter A. Haas Esquire LLC

(57) ABSTRACT

The present invention includes novel systems and devices for commissioning wireless tags, RFID tags, and wireless sensors. The present invention benefits wireless sensors that are not directly part of a demand printed label. In one embodiment RFID tags or inlays are pre-loaded into cartridges prior to consumption and an encoder mechanism and corresponding antenna encodes and verifies the programmable RFID tags within the cartridges. This improvement adds significant convenience of loading RFID tags and enhances overall reliability of handling and applying the RFID tags. Accordingly, the present invention includes methods and devices that enable application and distribution of RFID tags in pre-loaded cartridges that are ready-to-use.

4 Claims, 22 Drawing Sheets

U.S. PATENT DOCUMENTS

| | | |
|---|---|---|
| 7,012,531 B2 | 3/2006 | Fries |
| 7,034,689 B2 | 4/2006 | Teplitxky |
| 7,066,667 B2 | 6/2006 | Chapman |
| 7,069,251 B1 | 6/2006 | Bartz |
| 7,073,712 B2 | 7/2006 | Jusas |
| 7,075,435 B2 | 7/2006 | Jesser |
| 7,114,655 B2 | 10/2006 | Chapman |
| 7,187,294 B2 | 3/2007 | Burdette |
| 7,193,517 B2 | 3/2007 | Dods |
| 7,205,897 B2 | 4/2007 | Lin |
| 7,223,030 B2 | 5/2007 | Fessler |
| 7,411,503 B2 | 8/2008 | Stewart |
| 7,425,897 B2 | 9/2008 | Fukushima |
| 7,477,151 B2 | 1/2009 | Forster |
| 7,532,104 B2 | 5/2009 | Juels |
| 7,551,087 B2 | 6/2009 | Mcallister |
| 7,629,888 B2 | 12/2009 | Forster |
| 7,664,257 B2 | 2/2010 | Hohberger |
| 2002/0005774 A1 | 1/2002 | Rudolph |
| 2002/0067264 A1 | 6/2002 | Soehnlen |
| 2002/0149468 A1 | 10/2002 | Carrender |
| 2003/0227528 A1 | 12/2003 | Hohberger |
| 2004/0074964 A1 | 4/2004 | Falkenrich-wesche |
| 2004/0088230 A1 | 5/2004 | Elliott |
| 2004/0124235 A1 | 7/2004 | White |
| 2005/0045724 A1 | 3/2005 | Tsirline |
| 2005/0218219 A1 | 10/2005 | Sano |
| 2005/0242957 A1 | 11/2005 | Lindsay |
| 2005/0275540 A1 | 12/2005 | Halope |
| 2006/0017570 A1 | 1/2006 | Moskowitz |
| 2006/0061475 A1 | 3/2006 | Moskowitz |
| 2006/0080819 A1 | 4/2006 | McAllister |
| 2006/0118229 A1 | 6/2006 | Ohashi |
| 2006/0132313 A1 | 6/2006 | Moskowitz |
| 2007/0096852 A1 | 5/2007 | Lawrence |
| 2007/0152033 A1 | 7/2007 | Hind |
| 2007/0194889 A1 | 8/2007 | Bailey |
| 2008/0001724 A1 | 1/2008 | Soleimani |
| 2008/0181398 A1 | 7/2008 | Pappu |
| 2008/0196106 A1 | 8/2008 | Friedrich |
| 2009/0033464 A1 | 2/2009 | Friedrich |

SECURE MODULAR APPLICATORS TO COMMISSION WIRELESS SENSORS

PRIORITY CLAIM

The present application is a continuation-in-part application based on co-pending U.S. patent application Ser. No. 11/465,712 (U.S. Pat. No. 7,830,258) filed on 18 Aug. 2006, which claims benefit claims under 35 USC Section 119(e) of U.S. Patent Application No. 60/709,713 filed on 19 Aug. 2005 by inventor Clarke McAllister, and a continuation-in-part of U.S. patent application Ser. No. 11/767,471 (abandoned) filed on 22 Jun. 2007, which claims benefit claims under 35 USC Section 119(e) of U.S. Provisional Patent App. No. 60/805,777 filed on 26 Jun. 2006 by inventors Clarke McAllister and Timothy Mintzer. The present application is based on and claims priority from these applications, the disclosures of which are hereby expressly incorporated herein by reference.

BACKGROUND

The present invention relates to a system, including methods and devices, utilizing wireless sensor devices and RFID (radio-frequency identification) transponders. Specifically, the present invention relates to a system incorporating novel devices and methods that enable point-of-use and on-demand commissioning of RFID transponder-equipped wireless sensors.

Radio-frequency identification (RFID) transponders enable improved identification and tracking of objects by encoding data electronically in a compact tag or label. And, advantageously, the compact tag or label does not need external, optically recognizable or human-readable markings. In fact, using the Gen2 EPC specification, a three-meter read-distance for RFID transponders is common—even on high-speed material handling lines.

Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification. Commissioning, the process of encoding specific information (for example, data representing an object identifier, the date-code, batch, customer name, origin, destination, quantity, and items) associated with an object (for example, a shipping container), associates a specific object with a unique RFID transponder. The commissioned transponder responds to coded RF signals and, therefore, readily can be interrogated by external devices to reveal the data associated with the transponder.

Current classes of RFID transponders rank into two primary categories: active RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to specially designed remote devices such as interrogators.

Combining the benefits of the latest technology in RFID transponders with sensing devices, a broader class of devices called wireless sensors is emerging. Wireless sensors have a unique identity, sense one or more attributes within its environment, and report its identity and data corresponding to the sensed attributes. For example, a wireless sensor interprets environmental conditions such as temperature, moisture, sunlight, seismic activity, biological, chemical or nuclear materials, specific molecules, shock, vibration, location, or other environmental parameters. Wireless sensors are distributed nodes of computing networks that are interconnected by wired and wireless interfaces.

Wireless sensors, made using silicon circuits, polymer circuits, optical modulation indicia, an encoded quartz crystal diode, or Surface Acoustic Wave (SAW) materials to affect radio frequency or other signaling methods, communicate wirelessly to other devices. For example, certain embodiments of wireless sensors communicate on a peer-to-peer basis to an interrogator or a mobile computer. Communication methods include narrow band, wide band, ultra wide band, or other means of radio or signal propagation methods.

Herein the terms tag, transponder, inlay and wireless sensor are used interchangeably unless otherwise noted.

Additional examples of RFID transponders, wireless tags, and wireless sensors are more fully discussed in this inventor's co-pending U.S. Patent Application Publication No. 2006/0080819, entitled "Systems and Methods for Deployment and Recycling of RFID Tags, Wireless Sensors, and the Containers Attached thereto," published on 20 Apr. 2006, which is incorporated by reference for all purposes in this document.

One shortfall of prior-art, such as conventional print labels or barcode systems, includes a requirement for line of sight and an overdependence on the optical quality of the label. Many factors can render such a label unreadable including printing errors, excess ink, insufficient ink, physical destruction of the markings, obstruction of the markings due to foreign matter, and, in extreme cases, outright deception by placing an altered label over the top of such a print label.

RFID transponder labeling eliminates the need for an optically readable print label and overcomes all of the shortcomings related to print quality and the need for line of sight to scan the label. Moreover, RFID transponders enable secure data encryption, making outright deception considerably less likely to occur. However, current RFID label systems have their own limitations as well.

For example Zebra Technologies Corporation's Tsirline is the principal inventor of U.S. Pat. No. 6,848,616 (published on 1 Feb. 2005 to Tsirline et al.) with the title "System and method for selective communication with RFID transponders". In that patent the inventors describe a system having an RFID transceiver that is adapted to communicate exclusively with a single RFID transponder. They disclose that the system includes a printhead and a magnetic flux generator having a planar coil formed as a trace upon a first layer of a printed circuit board. As with the aforementioned references, this approach adds unnecessary cost and complexity by combining RFID transponders with demand-printed labels, and uses a near field coupler design that does not concentrate the magnetic flux as selectively as the present invention disclosed herein. Additionally, the inventors make no mention of spatially separating the RFID tag to be encoded from other programmable tags and the release liner. The novelty of doing so allows 1) the end user of the encoder to remove the programmed tag from the release liner immediately following encoding and 2) for the tag to be reprogrammed with new data without having to advance or retract the release liner. Inventor Tsirline failed to recognize or consider this novelty as the printer mechanism he proposes does not allow removal or reprogramming after encoding without advancing the release liner.

In U.S. Patent Application No. 2005/0045724, published 3 Mar. 2005, inventors Tsirline et al describe a printer system comprised of a printhead and RFID components to solve object identification problems. By contrast, the present invention clearly demonstrates that all aspects of printing on, with, or near RFID tags to facilitate identification is a wasteful and unnecessary encumbrance to efficient RFID tagging operations.

Inventor Feltz in U.S. Published Patent Application No. 2005/0280537, published on 22 Dec. 2005, discloses a system for reading and writing to an RFID transponder. The present invention cannot be anticipated by Feltz because an encoder is no more a printer than a tag is a label. Labels, particularly "SmartLabels" include a significant amount of printable surface area on the face stock material for printing symbols that are both human and machine readable. RFID tags and transponders may or may not contain such printable area, instead RFID tags and transponders provide wireless identification functions that are meant to supplement the optically readable functions of labels.

Tags are not Labels.

A key characteristic of the encoder of the present invention is that the encoder encodes tags of many different types, shapes, sizes, and thicknesses; which includes efficiently encoding thick tags, tags that are thicker than a sheet of paper because a foam layer is present. Such a tag design is advantageous for tagging metals or liquid containers.

Feltz illustrates in FIG. 2 the type of RFID transponder that is added to labels in order to make them compliant with retailer and DOD mandates. It is well known to those skilled in the art that such an RFID transponder will not operate when placed near metal or liquid. Those skilled in the art know that metal detunes the RFID transponder's antenna, and that liquids absorb radio energy just as they would in a microwave oven, resulting in heat, not RF communication. There are two dominant and notoriously well known mandates—Wal-Mart and the DOD. Both of those mandates clearly stated that only an RFID transponder had to be added to the previous labeling requirements. Those mandates also required that the transponders work after they were applied to the goods.

Retailer and DOD tagging mandates were clear, that the goods being tagged had to read, regardless of their construction, even foil-wrapped cartons, metalized mylar wrappers, and cases of liquids of all types had to read. This posed a problem for customers that bought RFID printers from Feltz's company. They found that the RFID tags that were encoded on his printer were not able to function when placed onto about 20% of the goods that are normally found in a retail supply chain. As such, Feltz does not really solve the mandate problem that he refers to in his paragraph [0005] where he makes the inaccurate statement that "One requirement is that certain record members e.g., compliance labels contain transponders". Feltz has it backwards; the U.S. Department of Defense and Wal-Mart RFID tagging requirements did not require any new labels at all. In fact, both mandates (which were the dominant, if not the only ones at the time) were written to provide their suppliers with a full range of compliance options, including the option of embedding an RFID transponder directly into a corrugated carton (for example), which would completely eliminate the need for any kind of label whatsoever.

Feltz' printer mechanism did not actually need print heads, ribbons, or ink to comply with the mandates; yet his design is completely based around these unnecessary elements. Even worse, those elements prevent his invention from dispensing the thicker type of RFID tag that actually works on what those skilled in the art refer to as "RF-challenged" goods that contain metal or liquid. Specifically, the anticipating reference is inoperable with thicker tags because the fixed spacing between platen roll 63 and print head 69 of the Feltz printer invention is sized for thin paper-like labels, not thick dielectric-backed tags. Attempting to encode tags with a dielectric foam spacer would clog the printer with a mass of sticky detached RFID tags that would quickly accumulate in a useless clump at print head 69. The extra bulk reduces the mobility of his printer and consumes significantly more power, whereby ruling out any anticipation of a battery operated mobile encoder.

Tags: Thick or Thin.

The encoder of the present invention programs and verifies tags and transponders of almost any type including transponders with a dielectric spacer built into them. Note that this type of compliance tag is much thicker than the labels that Feltz discloses in his FIG. 2. A transponder with a dielectric spacer is at least ⅛" thick and will easily pass through the feed mechanism of the present invention.

Smaller Tags.

Since the mandates did not require any more labels, and the items that are to be tagged include branded items and containers, the brand owners do not want their brand images and products with big stickers all over them. Therefore, smaller and less obvious is better and more appealing to consumers and brand owners. Feltz struggled with this, as is stated in his paragraphs [0005] and [0007] wherein he states that his invention provides for labels that have transponders spaced at a distance of 6 inches, which is an improvement over prior art. It is obvious that Feltz understands that smaller is better when it comes to dispensing large amounts of unnecessary label material.

Poor Resolution.

Had Feltz anticipated the elimination of the print head 69 he could have moved his encoding antenna 500 and 500' closer to delaminator 64'. This would have allowed him to use a smaller label (or even a tag) with a pitch on the order of 0.6" instead of 6". This would have allowed him to put 10 times more tags onto a roll and create far less waste. It is obvious that Feltz did not anticipate any of these things because his antenna selectivity is inadequate for that. His use of microstrip antennae 500' or 550' do not have enough selectivity as shown in his spatial signal strength plots of FIGS. 28 and 29 and his statements in his paragraph [0068] that the tightest recommended tag spacing is 2 inches. Had Feltz anticipated a printerless encoder, he would have strived for spacing that is much tighter than 2 inch tag pitch.

United States Patent Application No. 2003/0227528 by Hohberger et al. published on 11 Dec. 2003 describes another attempt at improving demand-print labels by providing a device that combines two standard, die-cut rolls of media, one of which may be a roll of RFID transponders, and the second, print-label stock, in an attempt to provide on-demand smart labels. As with the aforementioned references, this approach adds unnecessary cost and complexity by combining RFID transponders with demand-printed labels.

Additionally, U.S. Pat. No. 7,066,667 issued to Chapman et al. on 27 Jun. 2006, U.S. Pat. No. 5,899,476 issued to Barrus et al. on 31 May 2005, and U.S. Pat. No. 6,246,326 issued to Wiklof et al. on 12 Jun. 2001, describe a device that commissions an RFID transponder with a printed label. This approach, however, introduces unnecessary waste, cost, and propensities for error. There is a growing category of applications that do not require anything other than a custom-encoded RFID transponder. This prior art calls for the inclusion of label printer hardware and related consumable materials that are not necessary for many RFID applications. Unneeded printer mechanisms create unnecessary complexities, size, and weight. In some instances this additional bulk hinders practical mobile applications.

U.S. Pat. No. 6,486,780, published on Nov. 26, 2002, inventors Garber et al disclose a hand-held item location device using RFID to seek and find library books. The disclosure emphasizes the importance of read range over great distances and large populations of RFID transponders, a quality that runs counter to the present invention that teaches how to localize radio frequency fields for programming only selected RFID transponders presented in succession for well-controlled encoding. Garber teaches techniques for searching and reading large collections of transponders in a library, not semi-automated transponder commissioning processes. The physics of Garber's invention is poorly suited to programming anything other than one transponder at a time that is carefully isolated by great distances from any other RFID transponder to avoid programming information into the wrong transponder.

Inventors Main and Kassens disclose in U.S. Pat. No. 5,763,867 published on Jun. 9, 1998, a hand-held data terminal with various scanner modules for the purpose of data acquisition. This patent, along with their subsequent and related disclosure in U.S. Pat. No. 5,962,837 published on Oct. 5, 1999, are examples of hand-held data collection devices for sweeping an RFID interrogation beam about an broad area around an operator (for example, a storage room or bulk-shelf location in a warehouse). This operating distance, however, lies beyond a close-range distance of a couple of inches and is limited to interrogation and data-acquisition, not encoding. Further, such devices are unable to limit their communication to RFID transponders that are in close-proximity of a few inches of the operator holding a hand-held encoder that includes a near field coupler.

Inventor Bennett in U.S. Pat. No. 6,830,181, published on 14 Dec. 2004, discloses a combination RFID and barcode scanner. Wherein an operator holds a handheld device in one location without moving the device and is able to read a barcode and read/write to an RFID transponder in the near vicinity. In the scenario that the RFID transponder is already on the package, Bennett's invention is an efficient device to encode RFID transponders with information gathered from the barcode scan. Though in the scenario that the RFID transponder is not already on the package, Bennett's novel ideas are no longer of much value. At which point, a majority of the operator's time and energy will go towards peeling an RFID transponder from its release liner and placing it on the package. The present invention increases the operator's efficiency by peeling and encoding the RFID transponder before it is placed on the package. In the present invention, the encoding occurs after the operator scans the barcode on the package and before the operator is able to reach and remove the transponder from the encoder. As such, the present invention allows an operator to be that much more efficient in commissioning RFID transponders by not waiting on encoding and peeling. By not having a means to peel an RFID transponder from its release liner, Bennett's invention is at a major disadvantage in tagging large volumes of item level consumer goods.

U.S. Pat. No. 7,223,030 by Fessler et al (published on 29 May 2007) and U.S. Pat. Nos. 7,249,819 (issued on 31 Jul. 2007) and 7,187,294 (issued on 6 Mar. 2007) both by Burdette et al, (inventors of Lexmark International, Inc.) disclose a printer/encoder system, and attempt to overcome the problems of detecting and locating an RFID inlay that is embedded somewhere in a printed label stock. The present invention overcomes that problem by eliminating the (larger) label, and only encoding RFID transponders, which generally have a physical outer dimension that very closely matches the embedded RFID transponder inlay dimensions.

Inventor Roberts in U.S Published Patent Application No. 2005/0283272, published on 22 Dec. 2005, teaches of a mobile encoding system for commissioning RFID transponders. Wherein, Roberts claims an apparatus for dispensing and activating electronic monitoring devices comprising: a) a receptacle capable of storing a supply of unactivated electronic monitoring devices; b) a separator cooperating with said receptacle for removing respective individual monitoring devices from the receptacle; c) an activator cooperating with said separator and configured to communicate an activation signal to an individual monitoring device removed from the receptacle by the separator; d) a verifier configured to communicate with the individual monitoring device subsequent to the activation signal to obtain a verification signal confirming that the individual monitoring device has been activated; and e) a dispenser cooperating with said verifier and operable for dispensing the individual monitoring device after receipt of a verification signal confirming that the individual monitoring device has been activated. Roberts patent application 2005/0283272 does not teach how an EM device is attached to an object that will be monitored. There is no mention of adhesives, screws, or any other means of attachment. This is in contrast to the present invention where adhesives are used to attach am RFID transponder to an object of the proper object class. In fact, it can be inferred that Roberts' EM devices have no exposed adhesive while they are being encoded, sorted, and stacked. Exposing an adhesive during these steps would obviously result in an unintended grouping of EM devices, stuck together, preventing passage of any additional EM devices. The problems addressed by the present invention require an additional and vital step that is not taught by Roberts' patent application: to associate and preferably attach an EM device to the correct type of object. Associating an encoded EM device of the correct type to an object of the correct type, is a vital step that is significantly prone to human error. Roberts does not teach any method for advancing and detaching programmed EM devices or RFID tags from a roll of conveyance web or release liner. Roberts only teaches that tags can be cut from a roll of EM devices that are separated by a perforation, but does provide any explanation regarding forward advancement of such a roll in coordination with the programming of EM devices: if the process is a continuous motion, or a start-stop action that is coordinated with the tag programming process. This is in contrast to Roberts' detailed explanation of the movements of other parts of the EM device dispensing apparatus. Detaching adhesive-backed tags is a critical process that leads to a transfer and subsequent attachment to an object that is only of the correct object class type.

Inventor Landt in U.S. Pat. No. 6,677,852, published on 13 Jan. 2004, teaches a: supply reel and take up reel means; radio frequency shielding; a means for associating data read from an RFID transponder with new data; a means for encoding authorization from an external authority for a selected numbering system; a plurality of authorization transponders adapted to provide the RFID transponder encoder device sets of preauthorized blocks of unique numbers for specific object classes; and acquiring object class information to encode multiple instances of unique number from that object class instance information in the transponder. Landt fails to describe how the uniqueness of numbers is assured. In fact, the issue of uniqueness is not adequately addressed in his U.S. Pat. No. 6,677,852. His only mention of uniqueness is suggested only as a possibility, whereas it is actually imperative to the proper functioning of a global tracking system such as that which is enabled by the EPCglobal numbering system. Landt fails to describe any authorizations that are related to numerical uniqueness. Instead, Landt's authorization keys must match a security field that is already present within a tag. Therefore Landt's authorization tags are like a password that unlocks a tag to enable it to receive new data. This is in contrast to an authorization to a tag encoder to authorize it to issue unique numbers to tags, regardless of any password requirements that may or may not exist. Despite Landt's efforts to broadly describe the instructions, he falls short of showing that he in any way anticipates the need for or challenges of writing unique serial numbers to uniquely identify RFID tags. His only mention of tag ID, number field 208, only relates to the essential presence of the field and the possible need to search through a population of tags by using the tag ID field. Furthermore, Landt demonstrates a lack of appreciation for the vital importance of having a unique tag ID, which is central to the premise of tracking objects within a global supply chain, when he states "The tag ID number field 204 provides a serial number or other identifying number for the data tag 102, which may be a unique number.", which indicates that Landt did not understand that uniquely numbered tags are an essential part of using numbering systems such as the GS1 EPCglobal system. To further illustrate this point, Landt makes no mention of any numbering system that would be well known to those skilled in the art to assure numerical uniqueness in a tag ID field 204 or any other field disclosed in his invention. In Landt's discussion of writing to RFID tags, he never provides any information that would suggest that his invention is capable of assuring that unique tag ID's are written to tags, nor even describes writing tag ID's in any manner. Therefore it is apparent that U.S. Pat. No. 6,677,852 falls short of disclosing a data carrier of any kind that carries with it unique authorizations that are to be used by an RFID tag encoder for assuring that any tag ID's written to an RFID tag originate from a central number-issuing authority (such as from Uniform Code Council, GS1, Auto-ID Center, EPCglobal, ISO, etc.).

In U.S. Pat. No. 7.114.655, published on 3 Oct. 2006, inventor Chapman teaches the use of an RFID printer system, a printer programming language that contains RFID encoding instructions, and a conveyor system to move objects through the printing and encoding process. The prior art teaches how to encode data into an RFID label. The present invention teaches how to encode data into an RFID tag. As previously argued, an RFID tag is not an RFID label. An RFID label contains additional face stock material as a printing surface. That surface is printed with human readable and or optically machine-readable indicia. The printed information is not required for reading data using a radio frequency signal.

Inventor Waters in U.S. Pat. No. 7,077,489, published on 18 Jul. 2006, teaches an apparatus for printing and memory tag application onto a base medium. Waters fails to make the case for achieving the required functionality on a typical RFID tag. Water's invention is restricted to the use of specially prepared RFID tags that have adhesive on both sides of the tag. This unconventional tag configuration must overcome the adhesive forces that attach the tag to the webbing by having stronger adhesive forces that provide the force that is necessary to overcome the first adhesive bond. Waters fails to explain this acute short coming and relies upon this critical factor for successful transfer of the tag on each "thump". In the absence of a proper control of this critical factor, the tags will not release, or will partially release, causing the applicator to clog or jam. The present invention overcomes these sever short comings by using a conventional RFID tag with adhesive on only one side, eliminating any chance of a mis-balance between adhesive forces between a first and a second side of the RFID tag. This is a significant and novel differentiation from the Waters patent.

Inventor Sureaud in U.S. Pat. No. 7,320,432, published on 25 Jan. 2005, discloses a system for reading and encoding the output of an identification printer. The system provides a portable device that can be adapted to the output of standard bar code printers, capable of reading the bar code of labels produced by the printer and encoding the chip of the same label with the information read without any modification and interaction being required with the system installed to which the printer is attached. The system disclosed by Sureaud applies to the niche application of luggage RFID labels. When compared to the application of item level consumer good tagging, the prior art fails to address 1) the difficulty of efficiently applying RFID transponders to an object, and 2) the difficulty of producing a unique data identifier based off the items stock-keeping unit (SKU). The invention disclosed by Sureaud simply converts a barcode's numerical string to a binary string. Whereas, the present invention is reading in a SKU, converting that SKU to a unique identifier, and encoding an RFID transponder with that unique identifier. It's important to note that a SKU is not a unique identifier. For example, two packages of identical socks will have the same SKU, but the data encoded into their RFID transponders will be unique to each package. The barcode scanner presented in the present invention is in one way novel in how the data read from the barcode scanner is used in producing the data encoded into an RFID transponder.

Inventors Sano et al in U.S. Published Patent Application No. 2005/0218219, published on 6 Oct. 2005, discloses a label and RFID tag issuing apparatus. Wherein, the label and RFID tag issuing apparatus, comprises: a sensor for detecting presence of an RFID tag attached to a container; a printer for recording information that corresponds to a bar-code affixed to the container; a bar-code reader for reading the bar-code recorded on the container; an RFID tag reader/writer for writing information corresponding to the bar-code to the RFID tag; and a controller for controlling all of said components. Sano is addressing a niche application of RFID technology (factory automation); whereas the present invention is concerned with item level consumer good tagging. Inventor Sano's invention fails to address the needs unique to item level tagging, wherein: no mention or concern is expressed regarding operator efficiency in encoding and apply RFID tags, and no means is provided to ensure unique serialization of an RFID tag while operating off network. Lastly, as mentioned previously, the barcode scanner presented in the present invention is in one way novel in how the data read from the barcode scanner is used in producing the data encoded into an RFID transponder.

So, despite recent advances in RFID technology, the state-of-the-art does not fully address the needs of efficient, economical, high-volume, cost-effective, reliable deployment and commissioning of RFID transponders, inlays, tags and wireless sensors. Large-scale adoption and deployment of RFID transponders depends on systems utilizing reliable, low-cost RFID inlays and efficient commissioning means.

SUMMARY OF THE INVENTION

The present invention overcomes the shortcomings of the prior-art attempts and, accordingly, provides systems, methods, and devices that commission RFID transponders on-demand and at a point-of-use utilizing wireless data transfer in a compact package that is well-suited to portable, mobile, or fixed use in multiple applications. Further advantages of the present invention will be well-appreciated by those skilled in the art upon reading this disclosure including the appended figures of the drawing.

In one embodiment of the present invention an RFID encoder consists of an RFID interrogator module adapted to enable encoding predetermined data according to a commissioning algorithm and communicating with an internal antenna, the antenna being adapted to encode the predetermined data on the RFID transponder; a memory storage device for storing at least a portion of the predetermined data; a processing means for controlling and communicating with the memory storage device, a means for providing a supply of RFID transponders, the transponders configured for tensile extraction from the encoder or, and a means for positioning the RFID transponder within the encoding field of the internal antenna or near field coupler to enable encoding of the predetermined data.

The present inventors have recognized that significant benefits can be realized from using wireless sensors that are not directly part of a demand printed label. Among them include improved deployment yield and efficiency, and greater mobility for the tag commissioning process. RFID tags pre-loaded into cartridges prior to consumption adds significant convenience, reduced labor costs, and overall reliability of the handling and applying of the RFID tags over current methods of hand loading loose rolls of RFID tags into RFID applicators. The cartridge system discloses a novel way to present an encoded RFID tag to the end user for removal; yet allows the RFID tag to be quickly re-encoded with new data without inconveniencing the end user by having to reposition the RFID tag.

DRAWING

DESCRIPTION OF THE INVENTION

Figure 1:
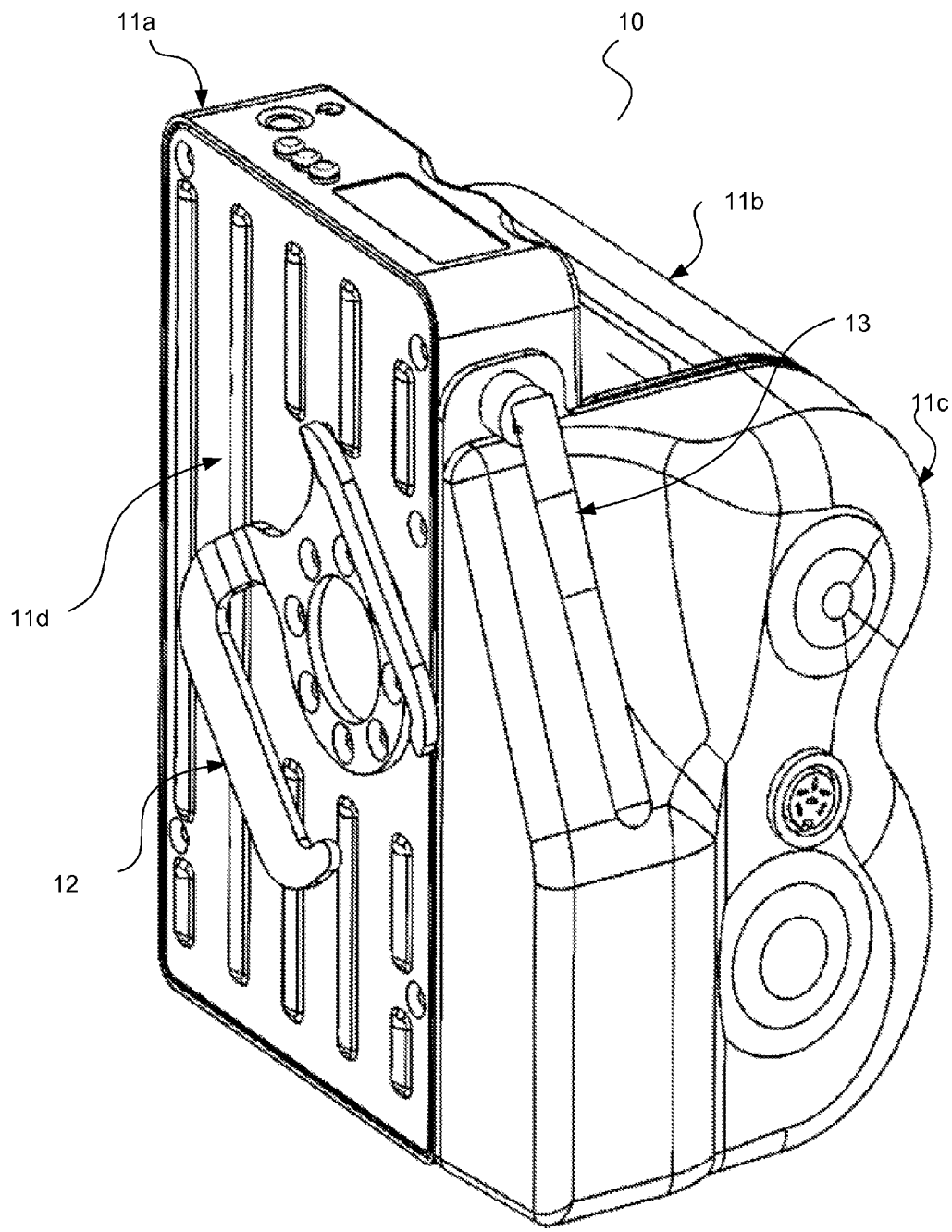
FIG. 1 is an isometric view of a belt-mounted or desktop version of an RFID encoder and cartridge according to one embodiment of the present invention.

Making reference to various figures of the drawing, possible embodiments of the present invention are described and those skilled in the art will understand that alternative configurations and combinations of components may be substituted without subtracting from the invention. Also, in some figures certain components are omitted to more clearly illustrate the invention. In some figures similar features share common reference numbers.

Certain preferred embodiments are directed to methods for tagging metal objects such as aircraft, boats, or automotive parts, tools, equipment, hospital assets, or other manufactured goods with metal surfaces. Certain preferred embodiments are also directed to methods for tagging transportation containers, airline baggage, apparel, pharmaceuticals, manufactured items, and retail goods. In most instances, the tagging methods will be described with reference to containers such as loaded pallets, paperboard boxes, corrugated cartons, pharmaceutical containers, and conveyable cases, but other containers may be used by these methods. Certain preferred embodiments relate to commercial corrugated shipping cartons, RFID or wireless sensors, tagged pallet-loads of shrink-wrapped cases, consumer goods packaging, consumer goods, or to other various methods of tagging objects.

Certain embodiments for providing the benefits of cartridge-based tag application are disclosed for cartons moving along conveyor lines. This document also discloses preferred embodiments that support operation and use of tag encoders in remote parts of the world where power and communications are not normally available, whereby extending the benefits of supply chain reporting to the head end of manufacturing processes anywhere in the world.

This document refers to transponders interchangeably with the term tags and inlays. A transponder is generally fabricated from an inlay, and optionally additional materials that maybe included as substrate material. Though many of the embodiments herein are described with reference to various inlays, transponders and tags, the methods and devices described herein may be applicable to other types of wireless tags, transponders, or wireless sensors. Wireless tags are a broad class of wireless devices that transmit and receive information wirelessly, have a unique identity, and optionally sense one or more attributes within its environment. Wireless tags include RFID transponders, RFID tags, RFID inlays, and wireless sensors. Wireless sensors are devices that report identity, and or some combination of additional information such as temperature, moisture, sunlight, seismic activity, biological, chemical or nuclear materials, specific molecules, shock, vibration, location, or other environmental parameters. Wireless tags are distributed nodes of computing networks that are interconnected by wired and wireless interfaces. Wireless tags may communicate on a peer-to-peer basis utilizing server based technologies, TCP/IP, FTP, and other commonly available digital communication protocols. Wireless tags may be made using silicon circuits, polymer circuits, optical modulation indicia, an encoded quartz crystal diode, or Surface Acoustic Wave (SAW) materials to affect radio frequency or other signaling methods. Wireless tags preferably communicate wirelessly to an interrogator, and certain preferred embodiments of wireless tags communicate on a peer-to-peer basis. Communication methods may include narrow band, wide band, ultra wide band, or other means of radio or signal propagation methods.

HF is an acronym for High Frequency. HF RFID refers to the internationally approved band that is centered at 13.56 MHz and generally uses inductive coupling for its air interface. UHF is an acronym for Ultra High Frequency. UHF refers to the band of the electromagnetic spectrum that, for RFID applications, spans from about 860 MHz to 960 MHz. Transponders and tags responsive to this frequency band generally have some form of one or more dipoles in their antenna structure. Such RFID transponders and wireless sensors utilize any range of possible modulation schemes including: amplitude modulation, amplitude shift keying (ASK), double-sideband ASK, phase-shift keying, phase-reversal ASK, frequency-shift keying (FSK), time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

Passive RFID refers to tags without batteries. Active tags have batteries and have been historically been considerably more expensive than passive RFID tags. Passive RFID tags backscatter incident RF energy. Active RFID tags often have their own transmitter and generally do not use backscatter for the return link. A battery assist tag is a sort of hybrid that uses a battery to power the RFID chip and a backscatter return link to the interrogator.

The RFID inlays are often comprised of an RFID chip bonded to an antenna, formed on a substrate that is often plastic such as Mylar®, polyester, or PET. Antennae may be formed by etching copper from the substrate, or from stamped aluminum foil, but an alternate method is to print multiple layers of conductive ink onto a substrate.

A preferred transponder design for use on metal objects is to place a layer of foam tape between an RFID tag and the metal object it is commissioned to. The thickness of the foam can vary, but is generally about 3/16 inch thick or less for use in the UHF band.

Certain preferred applicator and encoder embodiments use UHF wireless tags or UHF RFID tags such as Spec 3000709 from UPM Raflatac of Tampere, Finland, Model 9338 Squiggle Tag from Alien Technology of Morgan Hill, Calif., or Avery Dennison AD-220, or other wireless sensors. Such wireless sensors are preferably based on EPCglobal Gen1, EPCglobal Gen2, ISO18000-6C, or more recent standards and specifications. Certain other preferred embodiments read and encode HF tags such as SmartLabels manufactured by Texas Instruments of Dallas, Tex. Preferably wireless tags are manufactured to specifications that are compatible with encoder specifications as core diameter, outer diameter, and web width. Alternatively, certain preferred steps are required to prepare a standard roll of wireless sensors for use in an automated applicator/encoder, including unrolling from a large roll onto several smaller rolls having a smaller core diameter. Alternate preparation steps include fan-folding tags into a magazine or cartridge for transportation, handling, and subsequent use. Certain types of tags have no adhesive and are carried within a cartridge or magazine that fits into an encoder or applicator that later applies an adhesive at the time when a tag is encoded and commissioned for use.

Adhesive-backed tags are typically mounted onto a conveyance web made of paper or film substrates that are coated with a low surface energy material such as silicone. There are other earth-friendly paper coatings as well and are preferred wherever possible to reduce the amount of waste and environmental contamination. Silicones are known chemically as polyorganosiloxanes which are polymers with chains that contain between 1 and 1000 silicone atoms interspersed with an oxygen atom. Different organic groups can be attached to the backbone to modify the properties of the coating. Emulsion release coatings are water-base coatings that are an effective alternative to hydrocarbon solvent-based coatings.

A. System Overview

The present invention includes a system for commissioning wireless sensors at a point of use and on-demand. For example, in one embodiment, the present invention incorporates a mobile encoder device, which may be attached to a belt of an operator and powered by rechargeable batteries 202. The mobile encoder is in wireless communication with a remotely located host computer. The operator can selectively (on-demand) enable the mobile encoder to commission a transponder based on various criteria, including input received from a mobile bar-code scanner, for example.

Figure 16:
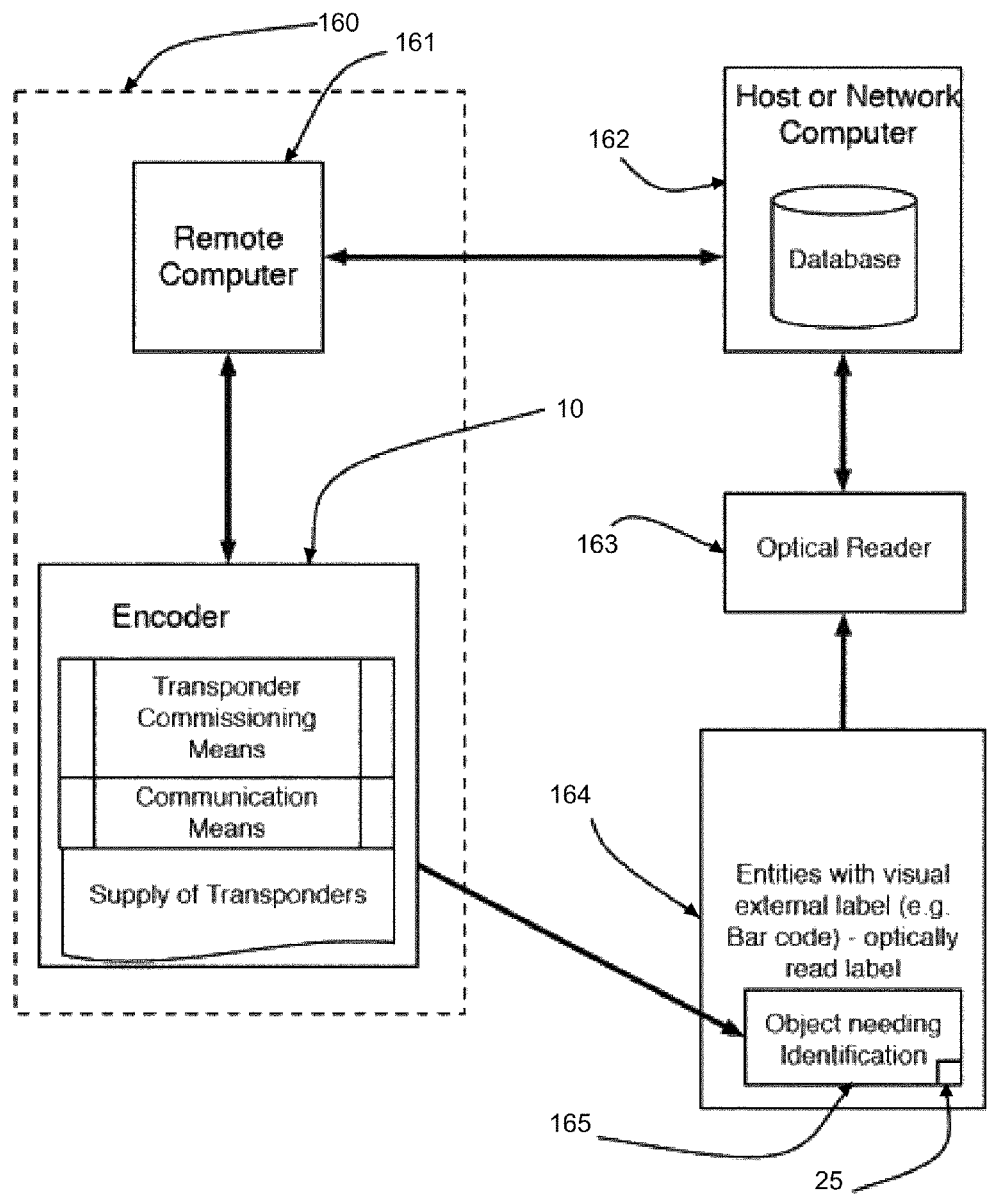
FIG. 16 is a block diagram of the system and environment according to one embodiment of the present invention.

FIG. 16 shows one system 160 according to the present invention in a typical environment, such as a packaging facility wherein a collection of entities with visual external labels 164 exist and a sub-set (or all entities) need to be associated with a wireless RFID transponder, tag, or label. The object 165 needing an RFID transponder could be a packing container having an assorted collection of entities 164. As entities 164 are pulled from the collection, a traditional optical reader 163 (human or machine) interprets the visual external label. Information from the external, visual label is correlated to information stored in a centralized location, represented by a network computer 162 having a database. The information taken by the optical reader 163 is transmitted to the network computer 162. System 160 includes a wireless connection between the remote computer 161 and the mobile encoder 10 either directly or through a common wireless access point. Additionally, a wireless connection could occur between the remote computer 161 and the host computer 162, and in this embodiment, the remote computer 161 is in physical connection with the mobile encoder. In yet another embodiment, the remote computer 161 wirelessly connects to both the mobile encoder 10 and the host computer 162. Optionally, the optical reader 163 can be incorporated in the encoder 10. In these aforementioned embodiments, the mobile encoder 10 is a portable device that can be easily carried by a human operator. As such, the mobile encoder 10 includes an internal power source 202 such as a rechargeable lithium-ion battery and would further include a handle or a belt-clip for ease of use. In another embodiment, the mobile encoder can be attached to a high-speed conveyor line. In such an application, the on-board battery could be replaced or augmented by a physical connection to a remote power source. Further, the computer 161 could have wired connections to the host network 162. Further details of possible configurations of the mobile encoder will be further detailed in subsequent sections of this disclosure.

In the system 160 of FIG. 16, the mobile encoder 10 carries a supply of un-commissioned (or blank) RFID transponders. Once the desired data is accumulated and presented to the encoder 10 from the computer 161, the encoder commissions an RFID transponder, creating an RFID tag or label 25 for the object 165. The commissioned tag or label 25 can then be applied, linked, or otherwise associated with the object by known means including a human operator or machine transfer.

B. RFID Transponders and RFID Transponder Security

Figure 13:
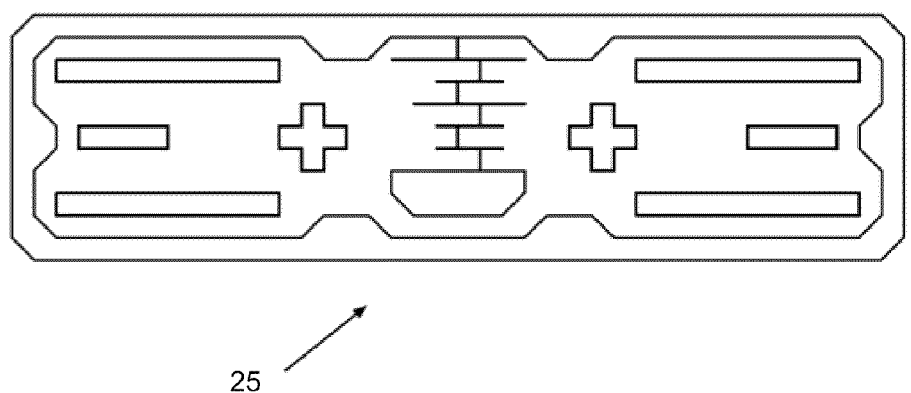
FIG. 13 is a top view of an RFID transponder according to one embodiment of the present invention.

FIG. 13 shows a possible RFID transponder 25. RFID transponders, essentially, comprise an RFID integrated circuit (IC) device (or "chip") bonded to an antenna apparatus, formed on a substrate that is often plastic such as Mylar®, polyester, or PET. One way to form an antenna structure is to etch copper from a substrate. An alternate way includes printing multiple layers of conductive ink onto a substrate. One additional method includes stamping UHF antennae from thin sheets of aluminum. In certain embodiments, RFID transponders and wireless sensors are recovered from waste streams for reconditioning, reprogramming, and reuse.

Other suitable RFID transponders include designs that combine a dielectric spacer behind the antenna to create a transponder that performs well over a broad range of packaging conditions. In certain preferred embodiments, foam is attached to an RFID tag in order to create fat (i.e. thick) tags that perform well when mounted onto metal objects or containers holding liquids. Fat tags can be encoded at a point of use, peeled from release liner, and applied to most any object.

In one embodiment, additional transponder layers include a thin and flexible energy cell comprising two non-toxic, widely-available commodities: zinc and manganese dioxide. One suitable energy cell is developed by Power Paper Ltd. of 21 Yegia Kapayim Street, Kiryat Arye, Petah Tikva, P.O.B. 3353, ISRAEL 49130, and incorporates an innovative process that enables the printing of caseless, thin, flexible and environment-friendly energy cells on a polymer film substrate, by means of a simple mass-printing technology and proprietary inks. The cathode and anode layers are fabricated from proprietary ink-like materials that can be printed onto virtually any substrate, including specialty papers. The cathode and anode are produced as different mixes of ink, so that the combination of the two creates a 1.5-volt battery that is thin and flexible. Unlike conventional batteries, this type of power source does not require casing.

An RFID transponder can optionally contain a top layer comprised of paper face-stock, which is a low-cost material but also is the least environmentally resilient. UV-resistant plastic face-stock generally provides the best survivability in outdoor and rough-service environments, and also provides the best protection for the RFID transponder assembly. The preferred embodiment of the present invention utilizes RFID transponders without this top layer, making use of just the RFID inlay. For many applications, printing is unnecessary for RFID tagging, thus a top layer comprised of paper is unnecessary and costly. Though for much prior art claiming RFID encoders, the paper face-stock layer is necessary to ensure successful removal on the RFID tag from its release liner. This is not the case for the present invention. The present invention is at the distinct advantage of being able to successfully encode and remove an RFID inlay from its release liner, and to present that encoded RFID inlay to the end user.

A bottom layer of pressure-sensitive adhesive (PSA) often is used for attachment of transponders to objects and often is referred to as a wet inlay, a wet tag or a wet transponder. Alternatively, a layer of clear, translucent, or opaque adhesive-backed film or tape is used to attach the transponder or wireless sensor to object or container. The tape, any thin, low cost, flexible material with a self-adhesive backing, such as a conventional packing tape, is well-suited for this method of attachment. The tape may be formed into various shapes to achieve the requirements of this method. Certain embodiments may use tape that is preprinted with certain logos, marks, symbols, bar codes, colors, and designs. Suitable adhesive-backed tape must not—or at least minimally—absorb radio frequencies within the range of frequencies used by the transponder or tag. The tape material, also, must not corrode the device or otherwise hamper its functionality.

Certain embodiments use a type of packing manufactured specifically for a given encoder. Packing tape can be single-coated pressure-sensitive adhesive tape or, alternatively, media constructed with multiple layers including a backing layer. Certain backing layers are constructed on a plastic film having one or more layers. Certain backing layers are made from plastic resins such as polypropylene (PP), polyethylene (PE), or copolymers of PP, PE, PVC, polyesters, or vinyl acetates. Certain embodiments of PP are mono-axially oriented polypropylene (MOPP), bi-axially oriented polypropylene (BOPP), or sequentially and bi-axially oriented polypropylene (SBOPP). Certain backing layers are biodegradable. Certain backing layers are coated with a pressure sensitive adhesive on one side and a low adhesion release coating on the other side to reduce the amount of power required for the encoder to unroll the tape for application.

Figure 14:
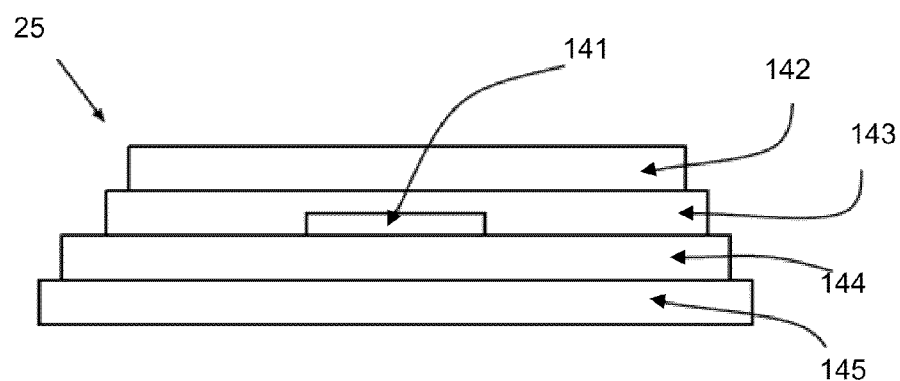
FIG. 14 is a schematic end-view of the RFID transponder of FIG. 13.

FIG. 14 shows a possible embodiment of an RFID transponder 25 that does not include an encapsulation layer comprising a separate tape. In this example, an adhesive layer 143 bonds with antenna layer 144 that is bonded to inlay substrate layer 145 and integrated circuit 141. Inlay substrate layer 145 and face-stock layer 142 provide resistance against electrostatic discharge (ESD) into antenna layer 144 or chip 141.

Other constructions for RFID transponders include one or more additional layers of high-dielectric material that encapsulate or substantially cover the inlay. In general, the thicker the dielectric layer the higher the voltage must be to initiate a flow of electrons through a dielectric layer. This results in higher ESD voltage ratings. Also, it is well known to those skilled in the art that thicker dielectric layers between antenna layer 144 and any other metal or liquid also tends to reduce parasitic loading of the antenna whereby maintaining antenna tuning for proper coupling to interrogators within a specified UHF band. In such embodiments, the integrated circuit chip and antenna bond to an adhesive layer and are protected from a discharge path through the tape layer by its particular thickness of dielectric material. A second dielectric layer bonds to the inlay substrate by a second adhesive layer, so that a low voltage discharge path is nonexistent around the two layers of tape substrate.

In another possible embodiment of an RFID transponder, the inlay substrate provides a second layer of ESD resistance against a discharge path through an outward-facing tape layer and associated adhesive layer. This construction protects the antenna and chip from electrostatic discharge originating from any direction. The encapsulation tape layer bonds to the antenna and chip via an adhesive layer and provides no adhesive bond to the transport container when the transponder is commissioned, and therefore depends on separate adhesive zones to attach to the container of interest.

In another possible embodiment, an RFID transponder includes multiple layers of ESD resistant material. For example, an outer layer substrate bonds to an inner substrate by an intermediate adhesive layer. A second adhesive layer bonds with the chip and antenna. The inlay substrate faces inward and presses against a transport container when the transponder is commissioned.

The contemplated adhesives in the various RFID transponder embodiments create strong and permanent bonds between tapes and inlay layers over a certain practical range of operating temperatures.

Because RFID transponders are designed to adhere to a container, one face of an external layer includes a pressure-sensitive adhesive. This external adhesive, however, must not cause mechanisms associated with the commissioning devices to jam. To prevent unwanted sticking of the RFID transponder, a transport layer protects the sticky, external adhesive. The transport layer is either a release liner such as a silicone-treated paper liner or a net (or mesh) web. A net or mesh web offers two principal advantages: less weight and being recyclable or reusable. A comparison of the weight of a net with a higher percentage of open area to a typical sheet of release liner reveals that the netting is lighter for any given section of comparable size. Environmental problems of disposal of release liner are well known. Mesh or netting, comprised of recyclable resins, is recovered after each use so that the mesh or net can be either reused or recycled for its constituent materials.

In one possible embodiment the mesh or netting is made of plastic such as nylon, polypropylene, polyethylene, HDPE, Teflon, or other resins. In other embodiments the mesh or netting is fabricated from metal or carbon-impregnated plastic to provide a conductive path to bleed electric charge away from points of accumulation.

Other advantages of a net or mesh transport layer include a substantial percentage of the adhesive not in contact with anything during storage and commissioning. When stored in a roll, a small percentage of the adhesive layer makes contact with the backside of the roll through the openings in the mesh. Thus, a small amount of energy is required to unroll the spool during transponder commissioning, yet there exists a certain amount of adhesion to prevent a converted spool from unraveling.

In other possible embodiments, the RFID transponders can include a surface suitable for human or machine readable, visible, external markings including bar-code symbols or alpha-numeric sequences.

Figure 15:
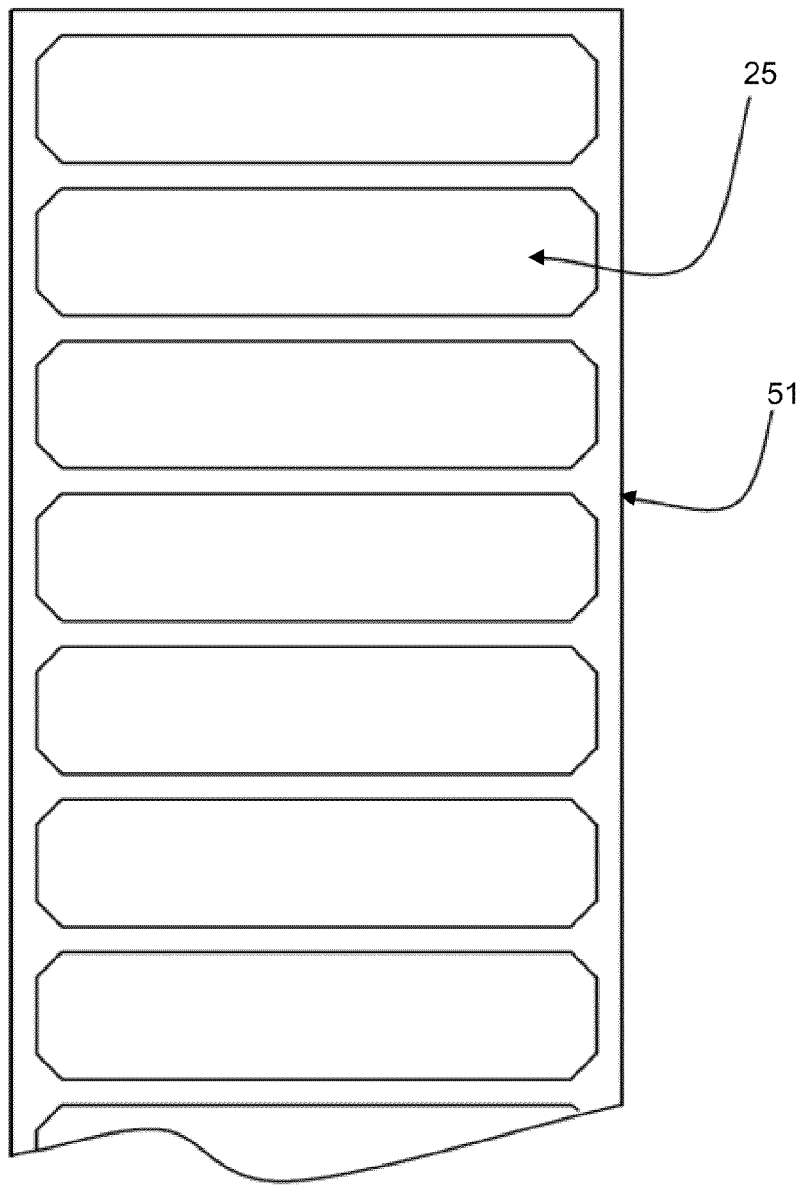
FIG. 15 is a top view schematic drawing of a sheet or roll of a plurality of RFID transponders of FIG. 14.

FIG. 15 shows another embodiment of RFID transponders 25 grouped on sheet stock 51 such as rolls or z-folded sheets that enables a plurality of transponders to be carried on a continuous web or traditional release liner. Other certain embodiments use transponders that are stacked and loaded into magazines for transport, handling, and automated dispensing. In certain embodiments, the magazines contain metallic shielding to protect transponders and inlays from electrostatic discharges (ESD).

In further embodiments, pre-encoded tags can be delivered in cartridge 11b for applications in which encoder 10 is used only to read data from tags to support the tag commissioning process and report results to a host.

Figure 17:
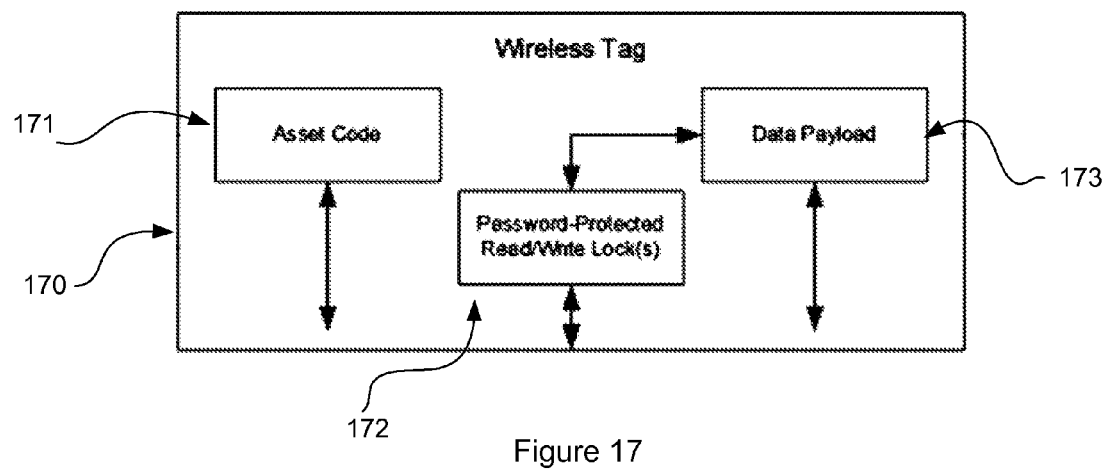
FIG. 17 is a diagram of a method of password protection of RFID tag data.

Tag security is achieved through the use of passwords that are required to unlock sections of tag memory for access and/or rewriting as is shown in FIG. 17. Data payload 173 of tag 170 may also be known as EPC memory or Unique Item Identifier (UII) in some implementations. Asset code 171 may be located within another memory partition that may be referred to as user memory or TID in some preferred embodiments. TID is a memory bank which is preferably encoded with information pertaining to the capabilities and model number of the RFID chip in the tag. In preferred embodiments, TID also contains a unique serial number and is capable of serving as a unique asset identification number (asset code). Password locking mechanism 172 is shown in this preferred embodiment to protect data payload 173, but other configurations exist to protect other memory partitions using other security means.

Figure 18:
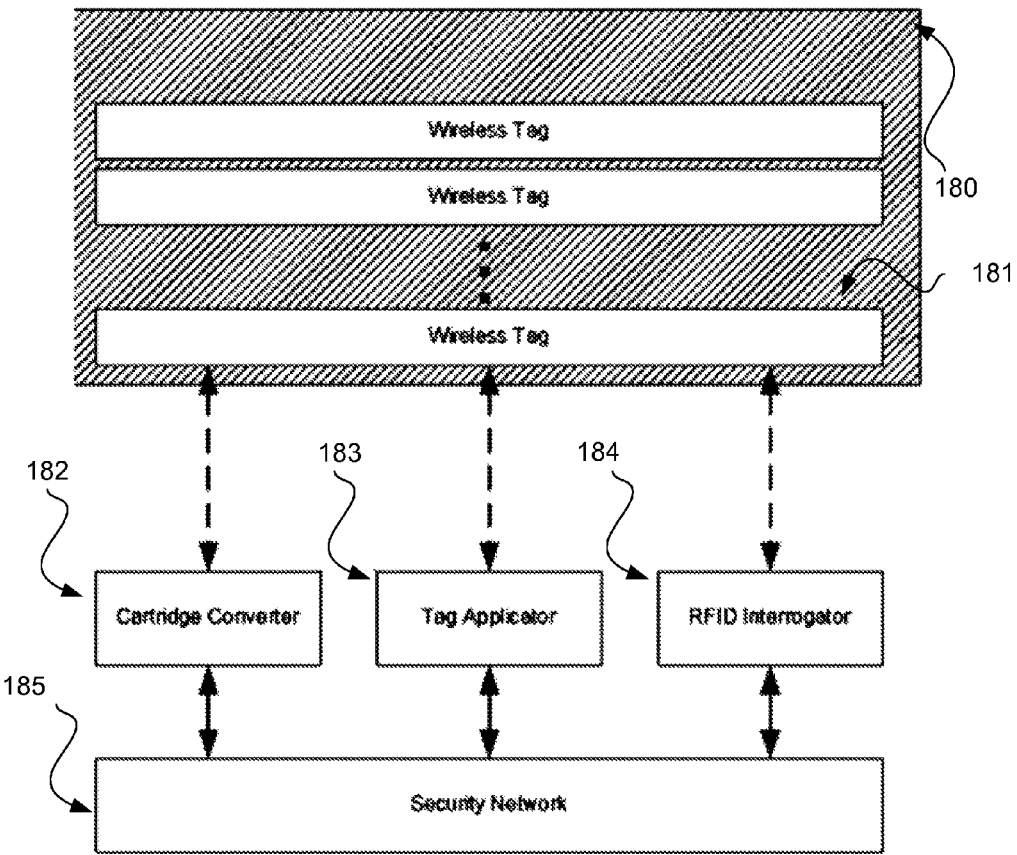
FIG. 18 is a diagram of a system to secure and control authorized access to wireless sensors in an open system of use.

Unique passwords are preferably generated by reading information from the tag and processing that information through an encryption engine to generate the required password. In a preferred embodiment shown in FIG. 18, a public key is stored on each RFID tag 181 within cartridge 180, 113a, or 11b, and a private key is hidden within each tag encoder/applicator 183 that is intended to access or rewrite tag 181. A preferred encoder/applicator 183 embodiment uses one private key for each authorized tag supplier. Cartridge conversion facilities having at least one cartridge converter 182 are issued an identical private key for locking tag 181 and others within each cartridge 180. Cartridge conversion facilities and machines preferably apply preprinted logos, human readable codes, or bar codes onto tag 181 and others like it before they are loaded into cartridge 180. Human readable codes may be comprised of information relating to manufacturing location, machine number, and date in order to create a unique number that can be used as an index to recover information about tag 181 if it later fails, or is the subject of a pedigree investigation.

Asset code 171 is preferably used as a permanent identifier that is used to construct a unique data item used as an input to an encryption engine. In this manner no matter what data is stored in data payload 173, tag 170/181 can be unlocked for access. Asset code 171 also has a second purpose for authentication. RFID interrogators like interrogator 184 is preferably used to read both data payload 173 and asset code 171 to authenticate tag 170. Counterfeit tags are readily detectable if the two numbers are not found to be previously associated in a trusted database, or to not have been found paired elsewhere, or without an approved tag pedigree. RFID interrogator 184 may be located in a waste stream choke point such as a carton baler or a paper mill that repulps cartons having RFID tags attached to them.

In 2001, the National Institute of Standards and Technologies (NIST) adopted the Rijndael algorithm as the Advanced Encryption Standard AES. The AES algorithm began immediately to replace the Data Encryption Standard DES which was in use since 1976. AES excels DES at improved long-term security because of larger key sizes (128, 192, and 256 bits). Another major advantage of AES is its ability of efficient implementation on various platforms. AES is suitable for small 8-bit microprocessor platforms, common 32-bit processors, and it is appropriate for dedicated hardware implementations (additional information available at http://csrc.nist.gov). Therefore a modern microcontroller or microprocessor with a tens of kilobytes of memory, a portion of which is random access memory (RAM) is suitable for storing tag data, passwords, encrypted data, unencrypted data, and enough space to perform mathematical and logical operations that are required for an encryption engine, including one as sophisticated as AES. RAM is preferably used with non-volatile memory to store different types of data that require varying degrees of persistence. For example keys require more persistence in memory than intermediate calculation results of an AES round. Machine memory is used to store data and variables as data sets are moved through a secure process of transferring data sets to and from programmable tags and to safely convey related data sets and related information to and from a remote host computer or other controlling device with minimal risk of security compromise.

According to NIST, a typical 8-bit microcontroller requires about 8,000 instruction clock cycles to run the AES algorithm. Most operations of AES are byte-oriented; and can be executed efficiently on 8-bit processors. The Advanced Encryption Standard AES is a symmetric block cipher. It operates on 128-bit blocks of data. The algorithm can encrypt and decrypt blocks using secret keys. The key size can either be 128-bit, 192-bit, or 256-bit. The actual key size depends on the desired security level. The different versions are most often denoted as AES-128, AES-192, or AES-256. Today, AES-128 is predominant and supported by most hardware implementations.

A key aspect of the AES algorithm is its simplicity, which is achieved by two means: the adoption of symmetry at different levels and the choice of basic operations. The first level of symmetry lies in the fact that the AES algorithm encrypts 128-bit blocks of plaintext by repeatedly applying the same round transformation. AES-128 applies the round transformation 10 times, AES-192 uses 12, and AES-256 uses 14 iterations.

A preferred embodiment for securely generating passwords where end when needed by authorized equipment and persons is to distribute one or more private (i.e. secret) keys to be embedded in tag encoders and applicators. Public keys can be comprised of data carried on the tag in any of the various memory banks, including: TID memory, EPC memory, user memory, or other memory partitions that may be referred to by other names. The public key and private key are then used by the AES encryption engine to generate a 128-bit result which can be used to derive a 32-bit password. A preferred way of using the 128-bit result is to break it into four 32-bit passwords to unlock memory partitions. Other passwords sizes can also be generated by using all or part of a 128-bit AES result.

Figure 19:
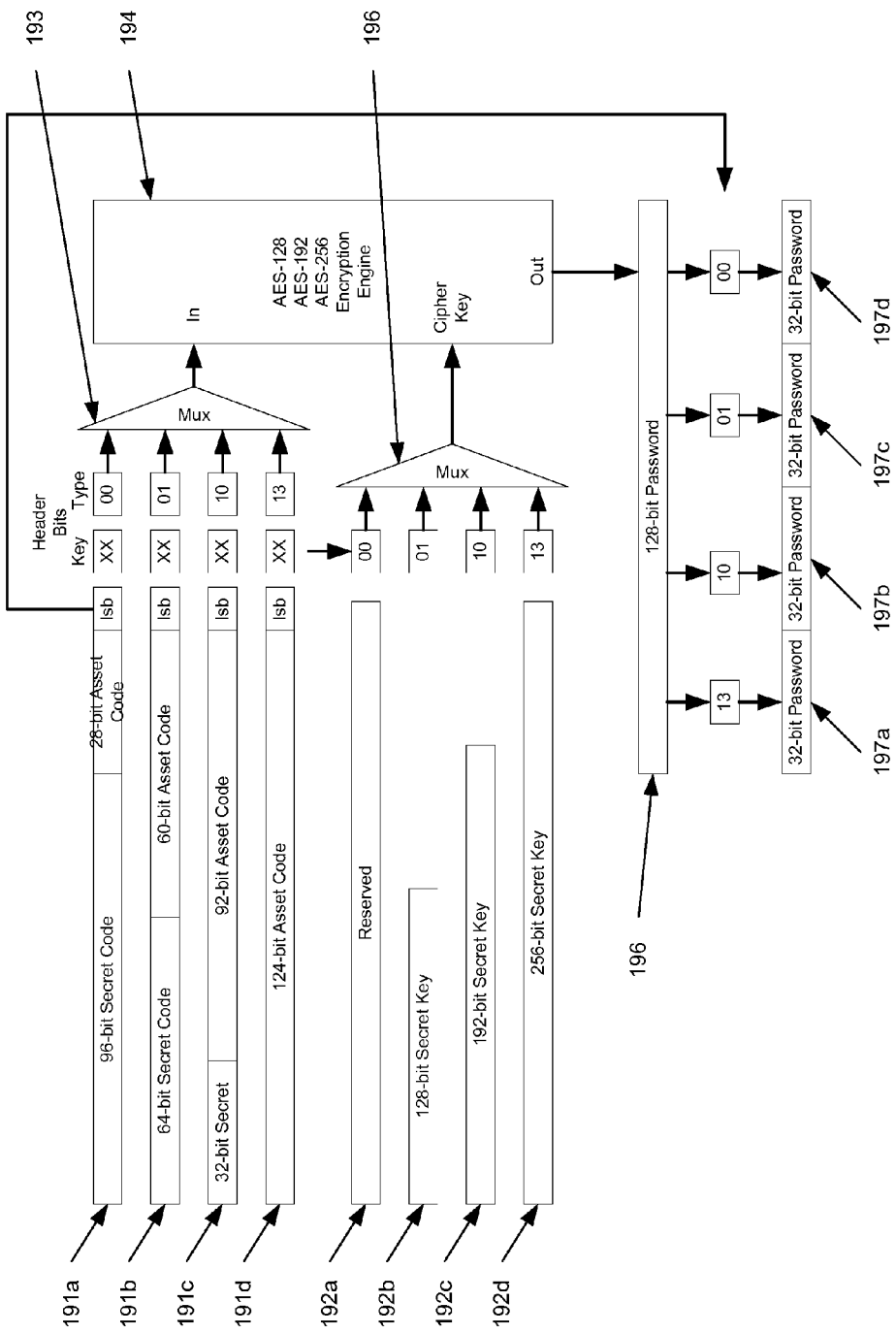
FIG. 19 is an AES Encryption Implementation for secure RFID tags.

Referring now to FIG. 19, AES encryption engine 194 operates with 128, 192, or 256 bit encryption keys. Inputs 191a-d to encryption engine 194 are comprised of a variable length asset code and fixed length header bits that are stored in each RFID tag. If the total of those bits is less than 128, the remaining bits are provided from a bank of secret codes that are embedded in each applicator or tag encoder. Input models for each asset code length are shown as inputs 191a-d. Input 191a is comprised of 28 bits, 191b of 60 bits, 191c of 92 bits, and 191d of 124 bits.

The choice of the key length is determined by two additional input header bits stored on the tag that control multiplexer logic 195 to select a key length and associated algorithm of 10, 12, or 14 round iterations for AES-128, AES-192, and AES-256 respectively.

Two additional header bits within asset codes 191a-d control selection logic 193 to select from among four possible input types the composition of the 128-bit input to encryption engine 194. Input 191a is of type '00' and is comprised of a 28-bit asset code, 4 header bits, and a 96-bit secret code that is embedded in the applicator. Input 191b is of type '01' and is comprised of a 60-bit asset code, 4 header bits, and a 64-bit secret code that is embedded in the applicator. Input 191c is of type '10' and is comprised of a 92-bit asset code, 4 header bits, and a 32-bit secret code that is embedded in the applicator. Input 191d is of type '11' and is comprised of a 124-bit asset code, 4 header bits, and no secret code.

Asset codes are preferably stored in a memory partition that is separate from the EPCglobal electronic product code or other similar primary identifier. Asset codes are preferably semi-permanent and are intended to survive more than a single use of the tag. Asset codes are preferably comprised of information that may include information about where and when the tag cartridge was originally encoded and assembled. In certain preferred embodiments such information includes facility number, machine number, time, date, and serial number or a pseudo random number. Alternatively, the asset number may be at least partially comprised of the tag identification number generated and permanently encoded by the manufacturer of the RFID chip. Serialized asset numbers enable encoder/applicator 10 to read each tag to determine which tag is being programmed and to report to a host or to an operator the number of tags that remain in cartridge 11b.

A preferred use of encryption keys is to protect tagged goods, particularly in supply chains from the use of counterfeit tags or cartridges. Each encoder or applicator can support multiple key types. Multiple keys support multiple tag or cartridge sources. Encryption key 192a is of unspecified length. Key 192b is a 128-bit secret key that is embedded in each applicator and encoder that supports a certain type or brand of tag cartridge. Key 192c is a 192-bit AES key. Key 192d is a 256-bit AES key.

128-bit password 196 is the output of encryption engine 194. Password 196 is broken down into four 32-bit passwords 197a-d under the control of the two least significant bits of the asset codes. In this manner, a single asset code can be used to generate four passwords, each of which can be used to access a separate RFID tag.

Tag encoder 10, 110, or 183 preferably does not encode any unsecured RFID tags. Preferred embodiments of tag encoder 10, 110, and 183 verify that each tag is locked and requires a prescribed level of security in order to write to it. Unsecured tags are preferably rejected at some operational level. The intent is to develop a market only for secure tags that are traceable to their origin to support a trusted pedigree for end users.

Tag data security is also provided by securing the tag encoder/applicator 183 against malicious code such as a virus. The main purpose of protecting applicator 183 is to ensure that RFID tags never contain information that can potentially disrupt the proper operation of interrogators and data processing equipment.

C. Mobile Encoder

RFID encoding devices that do not have a printing mechanism is a preferred embodiment of this new category of thickness-tolerant RFID encoding devices disclosed herein. This is because prior art printing mechanisms are intolerant of variations in media thickness. Media such as paper, tickets, and tags, including RFID tags are required to maintain a very high degree of flatness across the face stock material. This restriction is evidenced by even the slight bump that is caused by an RFID chip embedded under the face stock material of an RFID tag. Even modern printing mechanisms impose limitations to the overall thickness of the transponder as well as the aforementioned uniformity of transponder or label thickness. There are many applications where the additional cost, size, and weight of a printer mechanism is not clearly justifiable when RFID tag encoding is performed in a well controlled process to avoid human errors. Additionally, by not utilizing a printing mechanism, the present invention is able to peel, encode, verify, and present an RFID tag to the end user for removal.

FIG. 16 shows a system 160 according to one embodiment of the present invention including a mobile encoder 10. And, FIG. 1 details one possible mobile encoder 10. In this embodiment, the encoder can attach to the belt of an operator, accordingly, mounted on the housing 11c is a belt mounting means such as belt-clip 12, which easily adjusts for left-handed or right-handed operation and corresponding mounting on the belt (not shown) of the operator. An external antenna 13 enhances wireless connectivity to a host or network computer (not shown in this view), or to a remote-mounted computer device such as a PDA or bar code reader. Several operator indicator lights including as shown in FIG. 2 a system-ready LED 23a, data-ready LED 23b, tag-ready LED 23c, and battery-ready LED 42b mount on the housing enabling the operator an easy view of the device status.

Also included on the exterior of the housing is an external, power-cord receptacle 24c so that the on-board lithium-ion battery may be charged as required. A combination on/off-next switch 24a enables the operator to selectively power up the encoder. A reset port, such as a recessed reset button (not shown in this view), enables an operator to reset the software settings of the device as required.

A cartridge 11b containing a plurality of RFID transponders releasably mounts to a face of the housing 11c, having cartridge eject button 22 to eject cartridge 11b. The cartridge further includes a take-up reel 26a for non-dispensed RFID transponders, a port 36 (above take-up reel 26a but not shown in FIG. 1) for dispensing commissioned transponders, and a supply reel 26c for holding blank RFID transponders prior to commissioning.

Figure 3:
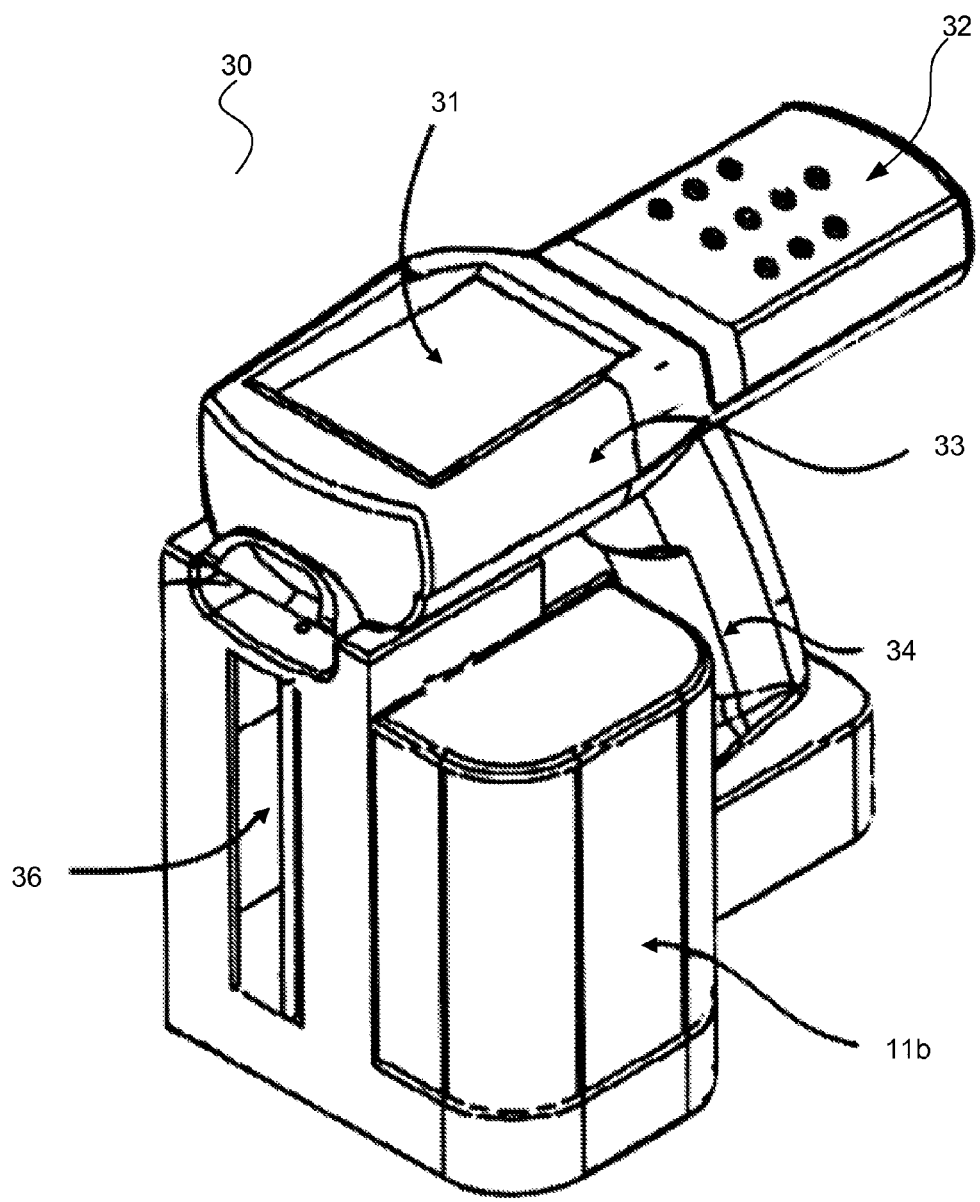
FIG. 3 is an isometric view of a hand-held, mobile encoder according to the present invention.

In one alternative embodiment, the mobile encoder 30 includes a handle (as FIG. 3 shows, for example) for hand operation of the encoder. In another contemplated embodiment, the mobile encoder is fixed to an assembly line in a stationary manner. Accordingly, the stationary-mounted encoder further includes machine-controlled devices for extracting a commissioned RFID transponder from the encoder and places the transponder on the container of interest by means well understood in the art.

Figure 20:
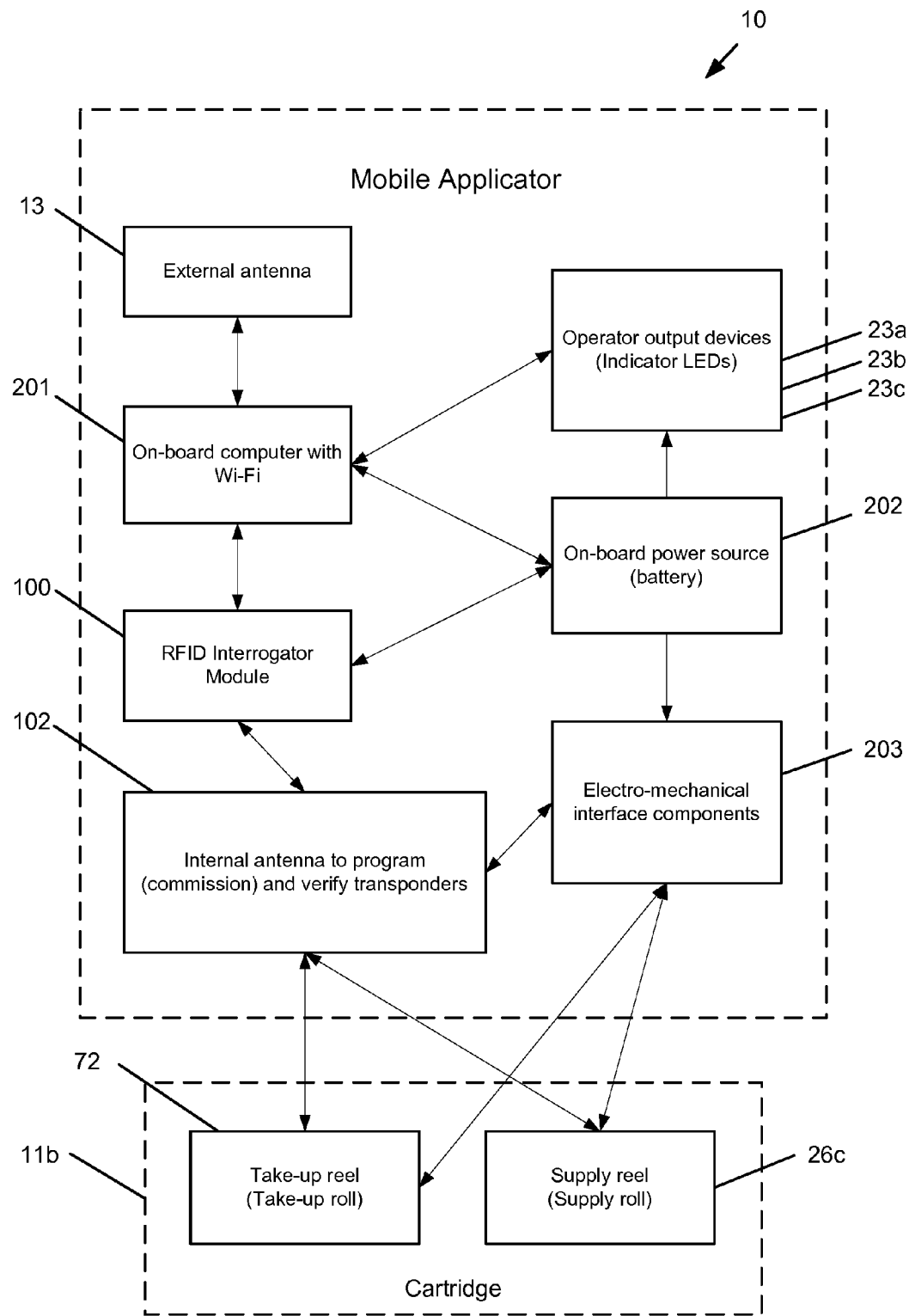
FIG. 20 is a schematic block diagram showing some components of the mobile encoder of FIG. 1.

In the aforementioned embodiments of the mobile encoder 10 of FIG. 20 (or hand-held encoder 30 of FIG. 28 or FIG. 3, for example) key features commonly shared include means for enable Gen2 EPC compliance and multiple printer-emulation modes. On-board power source 202, such as a rechargeable lithium-ion battery enables freedom of movement as does means for wireless connectivity to a data network, such as the 802.11 wireless LAN (Wi-Fi) standards-based communications protocol. However, a conventional power source that requires connectivity to a power-grid and a cable-based data network connectivity link would work under certain circumstances.

Further, in contemplated embodiments, the fixed or mobile encoder enables selective mounting to a magazine or cartridge filled with un-commissioned RFID transponders, which facilitates rapid and easy loading of the encoder with ready-to-use RFID transponders and further enables re-use, re-commissioning, and recycling of un-dispensed transponders and the associated cartridge. The mobile encoder can be monitored and controlled by virtually any handheld or mobile device, a host computer in a central location, or over the Internet.

Certain features and methods described and explained with relation to handheld applicators are also relevant to non-mobile RFID tag applicators that use a magazine, cartridge, reel, or roll to handle, transport, and dispense RFID tags, inlays, transponders, or wireless sensors. Magazines, cartridges, reels, and rolls are preferably capable of carrying either new or used tags and are preferably capable of being used in either mobile or nonmobile applicators. Magazines, cartridges, and reels are preferably refilled and reused. Magazines and cartridges preferably protect RFID tags from ESD.

Cartridges preferably indicate their empty/full status with a visible indicator such as: an LED, an LCD, a mechanical flag, a window with a view into the source reel, or other such indicators that help an operator choose which cartridge from which to next consume tags.

The mobile encoder 10 is activated (turned on) when an operator selectively depresses the combination on/off-next switch 24a. However, depressing the on/off-next switch for about three seconds or longer results in a sleep-mode cycle that can be interrupted by re-pressing the on/off-next switch. In sleep mode the operator indicators (LEDS 23a, 23b, and 23c) will turn off. If active, the mobile encoder system-ready LED 23a illuminates and connects to the assigned network. Network connectivity results in the illumination of both the system-ready LED 23a and the data-ready LED 23b. The encoder receives commands and data via the wireless link from the remote computer 161 or host network computer 162 (of FIG. 16). The data represents information to be encoded on an RFID transponder. The information is stored in the encoder's on-board memory and the tag-ready LED 23c rapidly blinks green (cycles on/off to pulsate). An RFID transponder is moved from within the cartridge 11b to a position on the top edge of the cartridge for encoding in the encoder and the transponder is encoded with the appropriate information. The transponder is tested and if it is good—contains the data and encoding was successful—all three indicator LEDs indicate a solid-green color. The operator removes the encoded RFID transponder from the encoder and places it on the container of interest.

In the event that the encoding process failed, the bad transponder is detected and retained by the encoder, where it remains on the take up reel 26a inside the cartridge 11b. The take up reel also collects the release liner as the encoder 10 dispenses good transponders (properly encoded RFID transponders). The take up reel returns to a re-cycling center where components are re-used or recycled as necessitated. Further, the re-cycling center can perform failure analysis on returned transponders.

Figure 27:
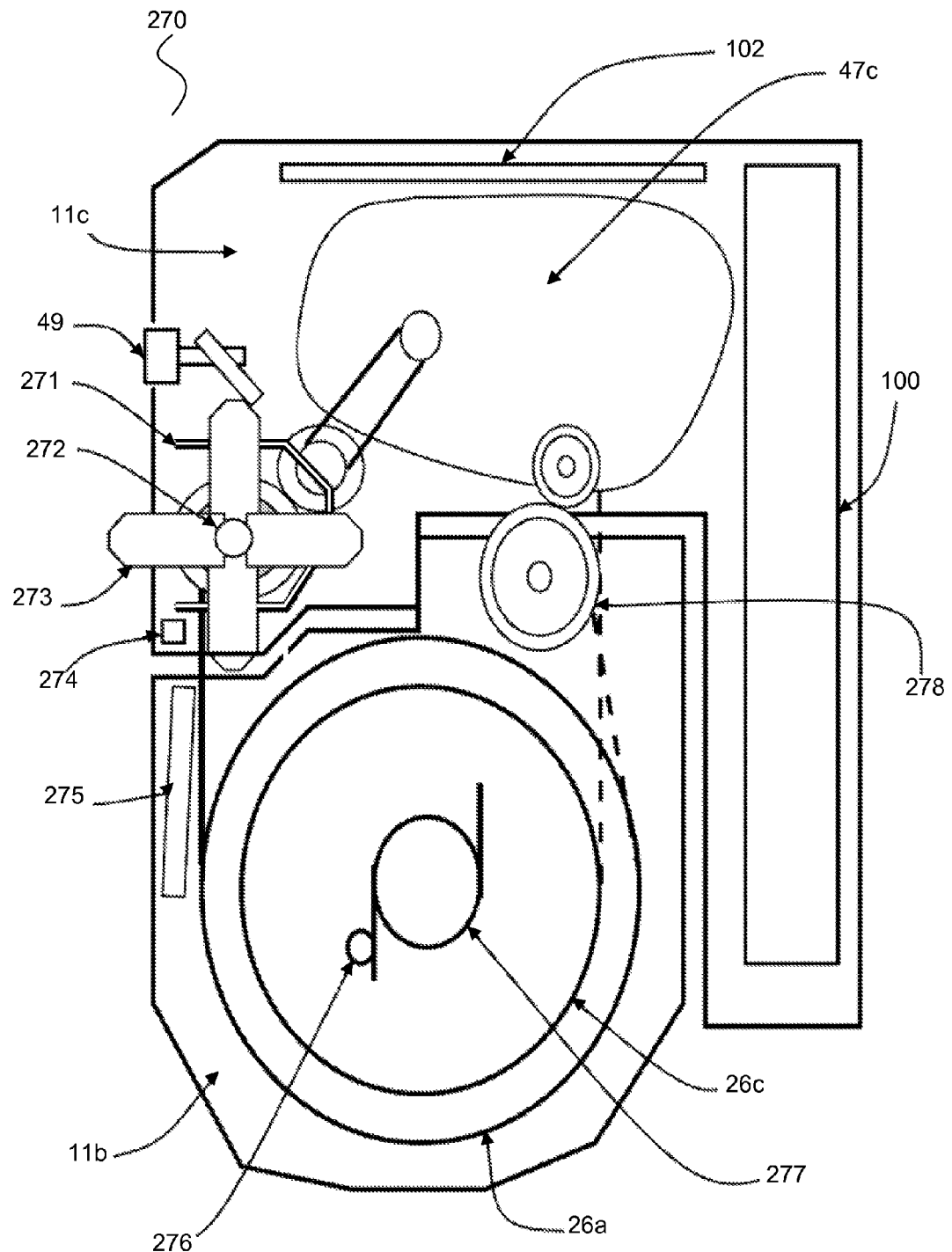
FIG. 27 is a schematic cross section view showing the electro-mechanical components of one embodiment of a mobile encoder.

FIG. 27 is a schematic diagram of additional electro-mechanical components 203 (as generally referred to in FIG. 20) and logic components of a possible encoder 10. An RFID Module 100, such as a MP9311 UHF reader module available from Sirit Technologies, 1321 Valwood Parkway, Suite 620, Carrollton, Tex., 75006, USA, communicates with a vertical polarized YAGI antenna 102 with a downward side lobe to low-power program (commission) RFID transponders to create an RFID transponder, and the same downward side lobe and verify transponders at low power also can read far-field transponders at a higher, second power. Additional components include a mechanical paddle trigger 49 for operator-selected automatic dispensing of the reel of RFID transponders stored in the supply or source reel 26c in the cartridge 11b. A drive motor 47c coupled to a dual output shaft gearbox drives the source transponder reel 26c via an intermediate take-up reel gear interface 278 at the cartridge mouth. Another gear assembly along with a spring couple 272 advances and positions the tag feeder paddle 273 with feedback from paddle position sensor 271. A tag sensor 274 detects the location of the RFID transponder to-be commissioned by the YAGI antenna 102. As the reel of RFID transponder advances inside the encoder, the lead edge passes the ratchet post 276. If the now-commissioned transponder is read by the antenna 102 as "good", a ratcheting-back torque spring 277 enables a peel device, such as the shield and tag peel edge 275, to engage, forcing the commissioned tag to peel away from the carrier layer, which continues on to the take up reel 26a. In the event of a "bad" tag—that is, the antenna 102 reads the RFID transponder and determines an error has occurred—the shield 275 does not engage, allowing the defective transponder to remain on the carrier layer and proceed to the take-up reel. Once the good transponder is removed from the encoder, the tag sensor 274 detects the condition and enables the encoder to stand-by for the next event. Transponders are read, written, and verified when an operator initiates an action such pulling a trigger 49, pushing a button, or some other command sequence.

Certain protective enclosures, such as cartridges 11b or magazines, are part of a family of interchangeable magazines of similar size, shape, and functionality, which are capable of housing and dispensing certain types, styles, shapes, and sizes of new or used RFID transponders. In at least one embodiment, the magazine or cartridge 11b includes a unique and embedded, RFID transponder which enables automatic interrogation and tracking of cartridge 11b. In certain embodiments, to minimize interference, the cartridge-specific and unique RFID tag or RFID transponder operates in a frequency band that is different than the supply of RFID transponders contained within the protective enclosure. Alternatively, other embodiments selectively interrogate cartridge identification transponders that operate in the same frequency band as transponders within the cartridge that are to be applied. In a preferred embodiment, during the process of looking for, reading, and encoding tags to be dispensed, the cartridge attached RFID tag (a.k.a. the license tag) is read and encoded by interrogator 100 with such information as: number of tags encoded under that license, number of tags allowed to be encoded under that license, encrypted passwords, and a unique cartridge identification number (authenticating the cartridge and tags housed inside). The license tag also preferably contains information to be read by interrogator 100 that informs the encoder as to what RFID tag or inlay type is housed within cartridge 11b. The encoder can then apply certain parameters to use to interrogate and advance the programmable tags housed within cartridge 11b. Example of parameters unique to each inlay or RFID tag type may include interrogator RF power levels, inlay/tag entry and exit velocities into and out of the encoding zone, and inlay/tag linear displacement parameters.

Certain encoders require replenishment of the battery or other internal, on-board power source 202, such as a fuel cell, or other energy storage technology. Accordingly, in some embodiments, an encoder 10 (or encoder 270, 30 or 40 of FIGS. 27, 28, 3, and 4) further includes a remote, selectively coupling base unit. The base unit enables a replenishment of magazines or cartridges, provides replaceable power sources, recharges the on-board power source, serves as a communications gateway, and provides a user interface for programming and maintenance of the encoder. For example, spare transponder magazines/cartridges are retained in cartridge pockets where they are protected from damage. Cartridges indicate their empty/full status with a visible indicator such as: an LED, an LCD, a mechanical flag, a window with a view into the source reel, or other such indicators that help an operator choose which cartridge from which to next consume transponders. The encoder, also, is retained by a protective pocket to prevent damage and to make any required electrical or mechanical connections to the base unit. In some embodiments a base unit mounts to diverse operating locations including various models of fork lift trucks. In such applications, the base unit includes a variety of wired and wireless communications options to enable omni directional communication with the encoder, cartridges, a host computer, vehicle mount terminal, a fork truck computer, or other relevant computing devices. The base unit includes a power system that is suitable for the application, including power filtering and energy storage capabilities such as batteries or fuel cells.

As with all ESD-sensitive equipment, care must be taken to avoid a build-up of damaging electrostatic charges. Accordingly, in certain embodiments charge is removed using a variety of conduction methods including wiping, air, and humidity controls.

In some embodiments, the encoder adapts to use a particular type of RFID transponder. One type of suitable RFID transponder is model number AD-220 from Avery Dennison of Brea, Calif. or, alternatively, Raflatac model 300846 from Tampere, Finland. Such a transponder is die cut and adhered to release liner. Additionally, wireless sensors are manufactured to specifications that are compatible with the specific encoder, including such specifications as core diameter, outer diameter, and web width. Alternatively, certain steps are required to prepare a standard roll of ALL-9338-02 tags for use in an automated encoder, including unrolling from a large roll (up to about 6-inches in core diameter) onto several smaller rolls having a smaller core diameter (of about 1-inch to about 2-inches in core diameter).

Encoder 10 communicates with a remote computer and includes options to physically, electrically, and communicatively integrate with a portable data terminal (PDT) or a mobile computing platform. Certain PDT's have a variety of wireless connections including PAN and WLAN. Certain PDT's include a barcode scanner comprising a laser, an imager, or other means. In other suitable PDT's an RFID interrogator and antenna are built-in, while certain others have a card slot manufactured to a standard such as PCMCIA, CompactFlash, or Secure Digital, into which the interrogator/antenna is plugged. An example of such a card is the MPR 5000 that plugs into a PCMCIA Type II slot and is available from WJ Communications of San Jose, Calif. The MPR 5000 is compatible with handheld computers such as the Hewlett Packard iPAQ5550 or other models that accommodate smaller card-form factors, enabling them to read and write EPCglobal or ISO 18000 compatible UHF RFID transponders.

Other events, information, and status—such as changes in transponder readiness, transponders remaining on the source roll, remaining charge in the battery, changes in range-status between certain predefined states such as Close, Near, and Far—are communicated to the associated PDT. Other possible information, including certain power management functions, commands, status, and data-to-be-encoded into each readied transponder, is provided to the PDT over a wireless connection. Such a configuration puts the encoder in the role of a peripheral device to the PDT 41*a*, with PDT 41*a* managing the primary user interface and most computation functions.

In some embodiments the encoder adapts to exchange information with a host device, including a PDT, in either a batch-mode or through a real time connection. Batch mode uses a periodically connected data transfer channel such as a wired connection. Certain wired connections include serial data, infrared, optical, Universal Serial Bus, a parallel port, or other physical data connection. Certain real-time connections include wireless data links including Personal Area Network (PAN), Wireless Local Area Network (WLAN), and Wide Area Network (WAN). Certain PAN connections include Bluetooth and Zigbee. Certain suitable WLAN connections include IEEE 802.11a, IEEE 802.11b, and IEEE 802.11g.

For certain encoder embodiments passwords are encoded into transponders or wireless sensors when they are commissioned. Passwords are safeguarded using cloaking, obfuscation, cryptographic techniques, secure and trusted channels, locked memory, and other methods that are commonly used to protect confidential information. Passwords are generated or retrieved from data encoded in an RFID transponder to generate an index into one or more databases that contain a one dimensional array of passwords, a two dimensional array of passwords, a multidimensional array of passwords, or an array of actual or pointers to algorithms used to generate passwords from transponder data, for example. Alternatively, cryptographic algorithms are used to generate passwords from transponder data.

Although this disclosure makes specific reference to a mobile encoder, it is understood that the encoder can easily adapt and be readily configured to a fixed operating environment. For example, it can be mounted to a forklift truck or a high-speed conveyer line and maintain advantages of wireless communication, rapid change-over and other qualities as discussed and developed more fully in this disclosure.

Figure 2:
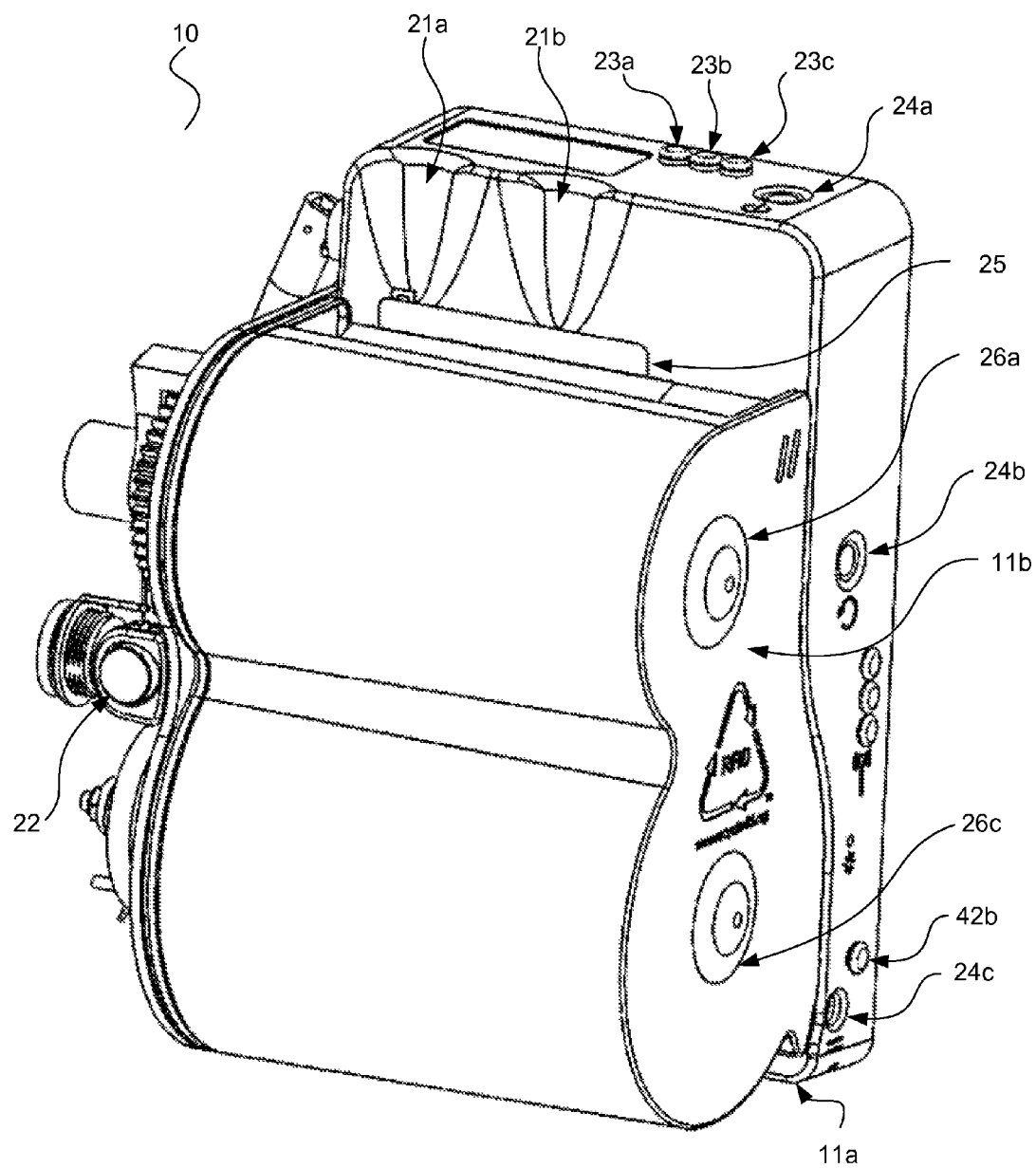
FIG. 2 is an isometric view of a belt-mounted or desktop version of an RFID encoder and cartridge according to one embodiment of the present invention.

Portable tag encoder 10 is illustrated in FIG. 1. Encoder 10 is a preferred embodiment of a portable non-printing tag encoder having a means for encoding or reading wireless sensors while they are in protective cartridge 11*b*, and having the ability to selectively peel away the conveyance web that retains and spatially organizes the tags within the cartridge.

Preferred embodiments have a main structural body 11*a*, electronics service panel 11*d*, a mechanical service cover 11*c*, a clasp, hook, or other means 12 for attachment to a person or another object. Preferred embodiments use special fasteners with security features to close, seal, and secure electronics service panel 11*d* to prevent unintended access. A preferred type of security feature has an unusual shape or fitting within the head of the fastener that prevents commonly available tools from removing the fasteners. A preferred shape is a center post that protrudes up from within the head to prevent common tools from engaging with the head.

Preferred embodiments also have means for communicating with external devices either through wires or wirelessly through antenna 13. Other preferred embodiments have a handle for manual dispensing of wireless tags onto an object or surface. A handheld tag applicator preferably encodes tags and wipes them from the release liner onto a desired surface. Other preferred embodiments actively transfer the tag from the release liner to an object such as a carton. Active transfer means include a rotary or linear motion element that breaks the remaining adhesive bonds between a tag and the release liner, and carry the tag to a target surface.

Referring now to FIG. 2, preferred portable encoder embodiments have means for interacting with a human operator, indicating when an encoded tag should be delivered, or when an encoding process should begin, or what information should be encoded into the next available tag. Encoder 10 is responsive to the presence of an operator's finger at sensor locations 21*a*, 21*b*, 24*a*, and 24*b*. The presence of a human finger is preferably sensed by capacitive coupling through an electrode, through a finger, and into ground reference. Sensing of a finger at sensor locations will control various functions including: power on, power off, ReDo (i.e. encoding the previous tag data payload into the next available tag), indexing to the next tag, confirming a process step to a process controller, discarding a tag to the take-up roll, turning on or off wireless communications, reading or verifying the data within a tag located outside of the material flow from source roll to take-up roll. Alternative embodiments use mechanical switches or optical sensors to detect input from an operator.

Figure 5:
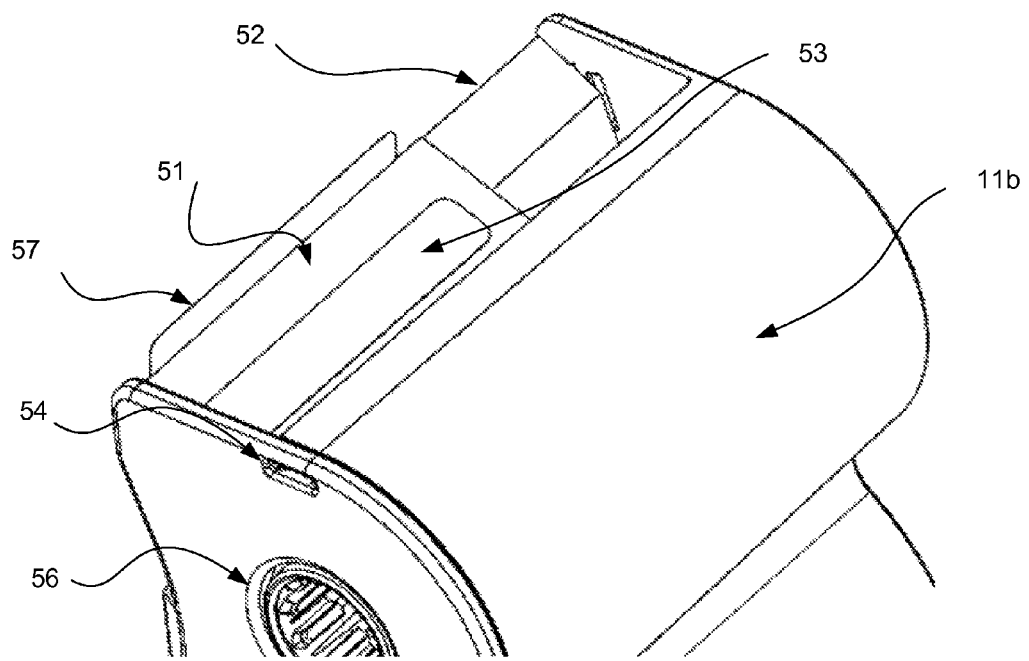
FIG. 5 illustrates an RFID tag partially separated from its release liner at a programming position against a cartridge peel plate.

Tag 57 of FIG. 5 illustrates the preferred orientation within cartridge 11*b* during the interrogation and programming process. Tag 57 is retained in the upright position by peel plate 52 which is obscured from view by release liner 51. Upright tag 57 is aligned with a feed path from the source roll. Paper-backed tags or tags with sufficient shape retention are required. Certain preferred tags contain other materials that retain mechanical shape sufficient to break adhesive bonds in order to self-peel tags from their conveyance or release liner.

Peel plate 52 is retained in position by the side cover which is latched into cartridge 11*b* by latch 54. Certain preferred peel devices are retained in an operable position without structural connections with the tag supply or cartridge.

Hub 56 is driven clockwise in FIG. 5 to produce torque that creates tension on release liner 51 and drives it forward.

Figure 6:
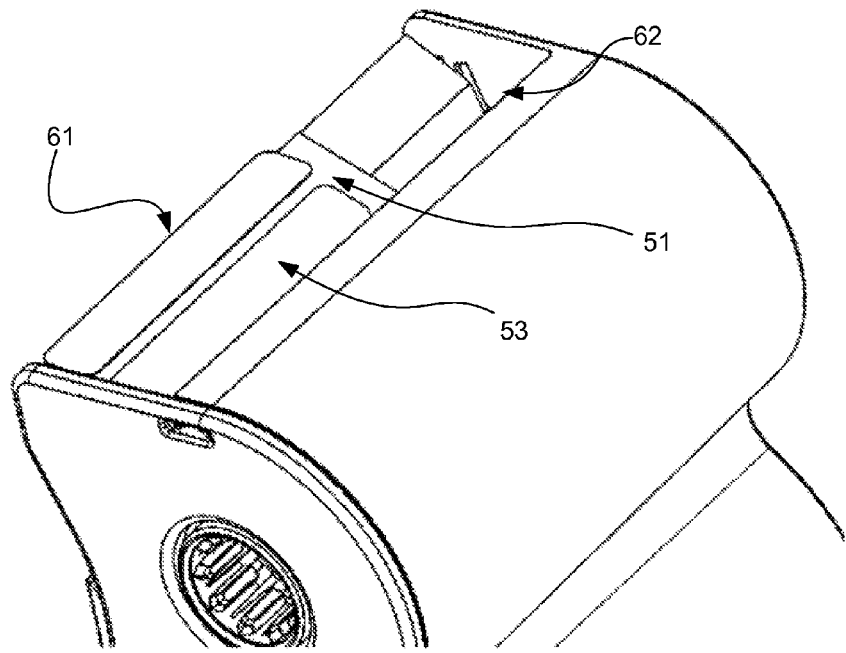
FIG. 6 illustrates an RFID tag being rejected onto the take-up reel of a cartridge.

Tag 61 is shown in FIG. 6 being rejected onto the take-up roll of cartridge 11*b*, reattaching it to release liner 51 in an orientation that is illustrated by rejected tag 53. It is important that the tag not be so tall that it hits edge 62 of cartridge 11*b*. Release liner is collected and returned to a tag loading location which relieves the end user of the problem and responsibility of disposal of silicone-backed paper. Silicone can be collected and separated from paper fiber repulping processes.

Figure 8:
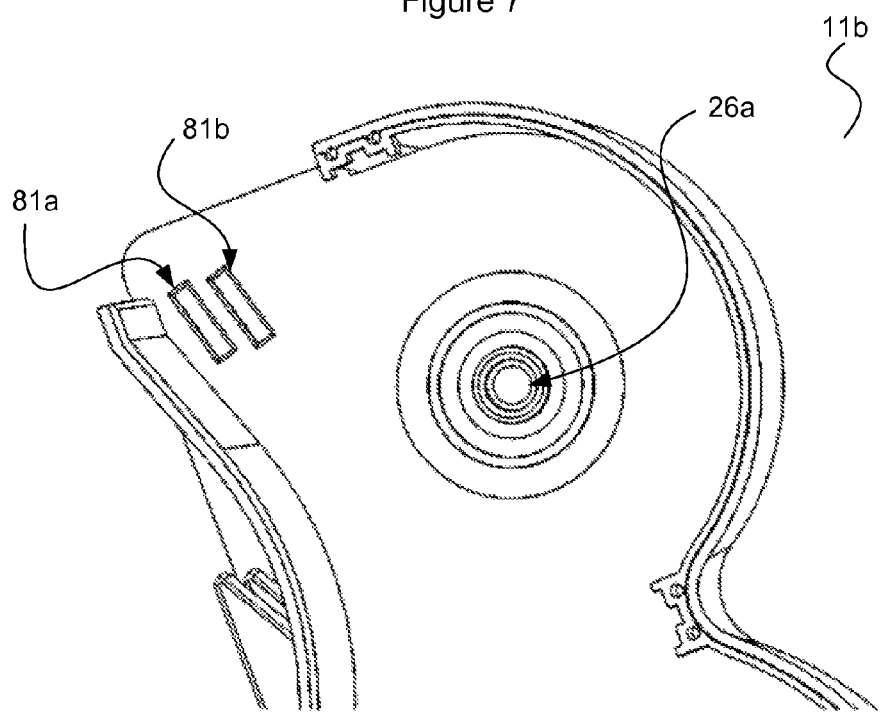
FIG. 8 illustrates two slots for mounting a peel plate into a cartridge body.
Figure 9:
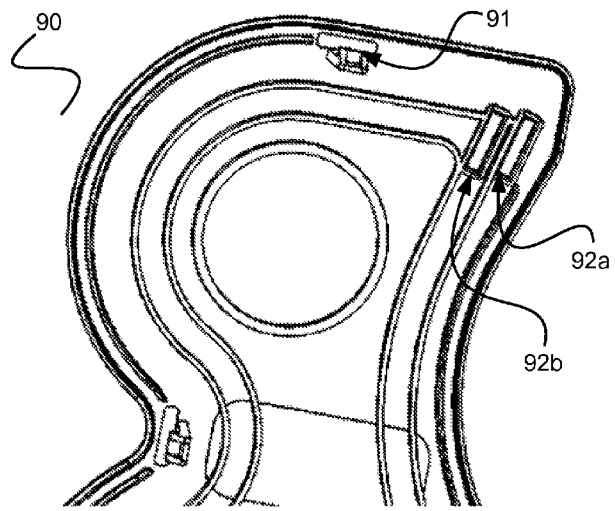
FIG. 9 illustrates two slots for mounting a peel plate into a cartridge cover.

In FIG. 8 peel plate 52 is retained in cartridge housing 11*b* by slot 81*a* such that it is presented in close proximity to the interrogator antenna or antennae pair within the encoder. Interrogator antenna pairs are used to separate the transmit and receive signal paths and are among the preferred embodiments for mobile encoders. When antennae pairs are used as near field couplers, each antennae establishes its own tuning in conjunction with the parasitic capacitance and inductance of surrounding materials, including tag inlays. The term tuning is used to describe complex impedance matching to a transmitter, receiver, or transceiver, typically 50 ohms. When antennae are matched, reflections are minimized and more power radiates from the antenna. When antennae are mismatched, the SWR (Standing Wave Ratio) is high and much less signal radiates from it. This invention describes a dynamic tuning process whereby the tag entering a predetermined programming zone brings antennae into tune, reduces the standing wave ratio, and improves near field antennae coupling.

Certain preferred encoder embodiments utilize a tag peel device that is not structurally attached to a cartridge, and is mechanically mounted to the chassis or housing of the encoder itself. The primary advantage to a peel plate that is mounted to the chassis or to the encoder housing is that the cartridge does not have to carry a mechanical load sufficient to withstand the web tension created by the drive reel and take-up reel. The result is that the cartridge could be fabricated from materials that offer less structural strength than plastics or metal materials, including disposable or biodegradable materials. Embodiments of this invention that are based on disposable or biodegradable materials offer users the option of an earth-friendly recycling method that does not involve the return of cartridges to a limited number of specialized facilities for reprocessing used cartridges. For example a one-time use cartridge could be designed to be opened by a user once the tags are all consumed, allowing the user to separate the spent release liner or other conveyance web from the cartridge housing itself, enabling the user to deposit each type of material into different recycle or waste streams.

Referring back to FIG. 5, the position of peel plate 52 is preferred for tags that are thin. Peel plate 52 ensures that tags are not mechanically stressed when tags are commissioned. It peels the release liner away from the tag, as opposed to peeling the tag away from the release liner, whereby risking mechanical damage to the tag.

Figure 7:
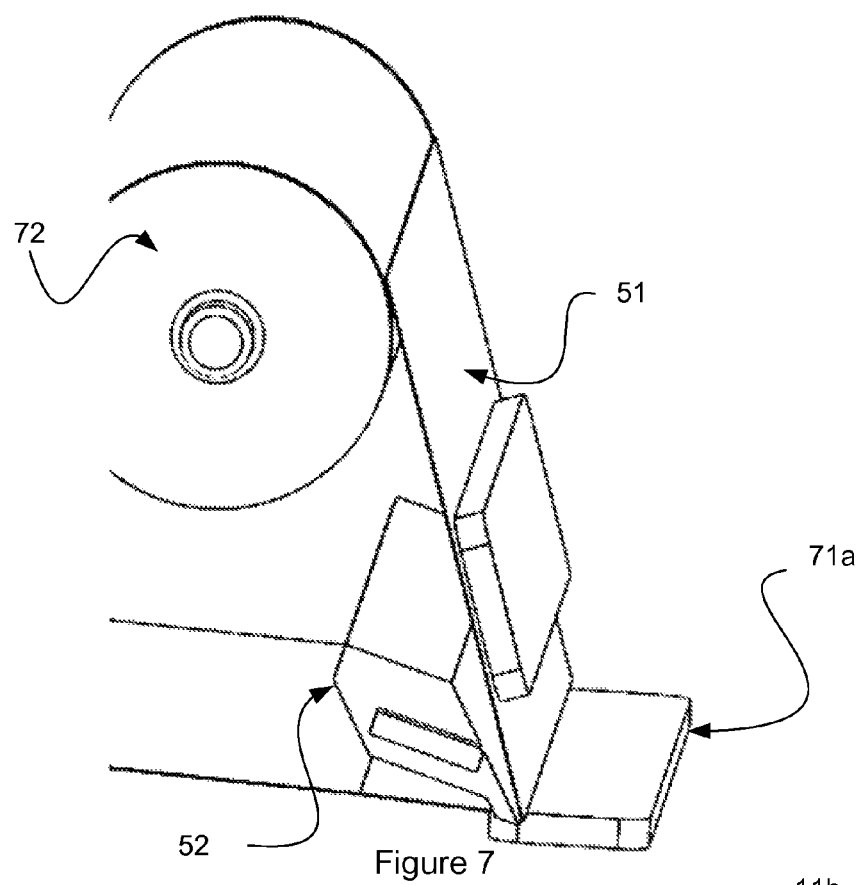
FIG. 7 illustrates a metal mount RFID tag being peeled from its release liner.

Tag 71a is a tag that mounts on and identifies a metal object. Tag 71a is preferably comprised of a layer of adhesive-backed foam as a dielectric spacer between the antenna and the metal that it is attached to. Tag 71a is presented for interrogation and programming at the preferred position shown in FIG. 7 whereby the release liner 51 is pulled toward take-up roll 72 as it is peeled from tag 71a while tag 71a is retained in the upright position by peel plate 52. Plate 52 is retained by slot 81b. Slot 81b is preferably about 0.2" back from slot 81a such that the release liner approach angle and tag clearances are set properly for tags with increased thickness backing. The thickness of the foam layer may vary, and in some cases remain compressed while on the source roll, and later expanding to its full thickness after it is programmed and removed from peel plate 52. Take-up roll 72 is retained in its operating position by cup 26a. A set of peel plate retaining sockets 92a and 92b are in cartridge cover 90 and correspond on the opposing side of the cartridge with slots 81a and 81b respectively. The entire cartridge is retained in compression by a set of latches, including latch 91.

Tag 57 does not bend much while release liner 51 is peeled away from the tag. It is at the peel plate 52 that tag 57 is the most spatially separated from the others on the web. It is at this point that near field coupler 102 and tag 25 together become tuned for a good impedance match to the interrogator. Encoding the tag that is about to be removed is preferred over embodiments where tags are encoded considerably upstream of the tag removal point; this is because it is simpler to remove a tag immediately after successful encoding rather than manage a queue of encoded tags. When there are no RFID tags in the vicinity of the peel plate, the VSWR of coupler 102 is likely to exceed 6:1. However when an RFID tag enters the region around the peel plate, the VSWR may drop to under 2:1, coupling a large part of the RF energy from the RFID interrogator into the RFID tag that is located at the peel plate. Helical near field coupler 102 is used to concentrate magnetic flux in an area behind the peel plate. It is preferably connected to interrogator 100 by microstrip 103 and a coaxial connector. Helical element 102 and microstrip 103 are surrounded by ground plane 101. Passive electronic elements such as resistors, capacitors, and inductors may be soldered onto the microstrip antenna feed to modify the input impedance of the antenna or to create a filter. For example a PI filter can be constructed from an inductor and two flanking capacitors to the ground plane. In a preferred embodiment, a resistor is used to load the antenna when it is unmatched. A resistor is soldered between the microstrip and the surrounding ground plane. Preferred values range from 100 to 1000 ohms, with a nominal preferred value of 390 ohms.

Figure 10:
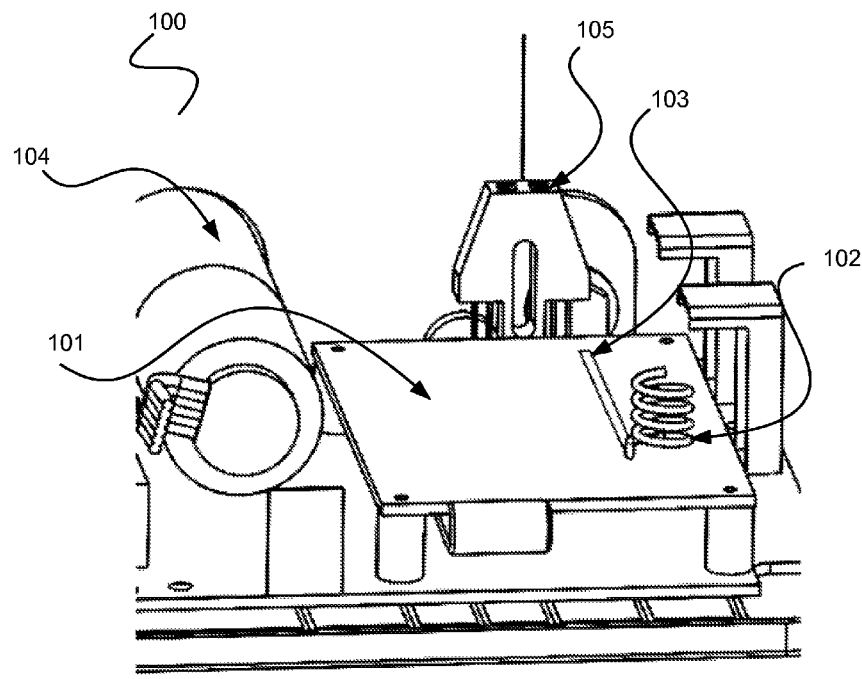
FIG. 10 illustrates a near field coupler used for programming tags in the programming position of FIG. 5.

The orientation of the major axis of the helical coupler can be either horizontal or vertical. A vertically oriented helical coupler is shown in FIG. 10. A horizontally oriented helical coupler is preferably oriented along an axis that is parallel with the major axis of tag 25. It is important that the helical coupler be positioned in close proximity to the peel plate so that the RF power of the interrogator can be reduced to a range between 6 dBm to 12 dBm. Vertically oriented helical coupler 102 terminates at its distal end at a point near the part of the plastic housing that is directly opposite the preferred tag programming zone on the other side of the plastic housing. Coupler 102 preferably launches from microstrip 103 such that it emerges from the printed circuit board at an angle with a tangent that is parallel to the short edge of the printed circuit board to which ground plane 101 is bonded. Concentrating a small inductive coupling field, while minimizing the electric field, helps to reduce the RF field strength reaching neighboring tags; and hence reduces the probability of coupling with tags that are not in the immediate vicinity of the peel plate. As described in the paragraph above that describes parasitic antenna tuning, when there is no tag at the peel plate location, coupler 102 becomes a poor impedance match to interrogator 100, and little RF energy radiates, reducing unwanted stray RF and unwanted tag couplings. In other words, the complex parasitic impedance of the tag is required for the antenna, antennae pair, near field coupler, or couplers to become tuned enough to successfully energize and communicate with a wireless transponder that is presented into the programming field.

The carbon content of the plastic housing that is shown in the background of FIG. 10 also plays an important role in coupling helical element 102 to tag 25. Carbon conducts radio frequency energy, altering the shape of the wave front that emanates from near field coupler 102 and from the signals reflected from the nearby tag or tags. The amount, position, and orientation of plastic parts containing carbon affect how a passive RFID tag is energized and how the backscattered signals return to the interrogator; the same is true for active tags and wireless sensors.

Figure 4:
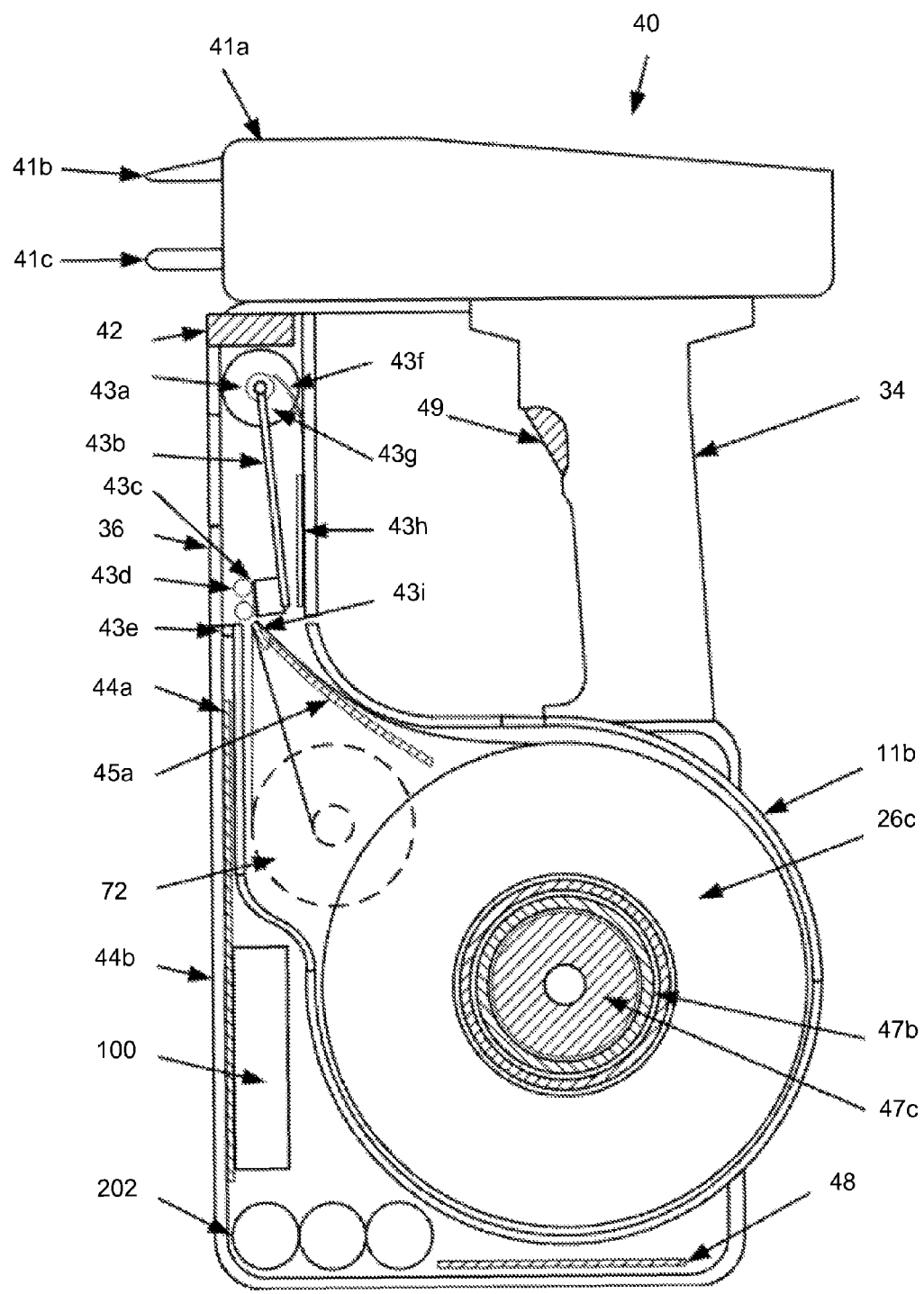
FIG. 4 is a schematic cross section of a hand-held, mobile encoder according to the present invention.

In certain embodiments an RFID encoder is combined with a sensor suite 42 as shown in FIG. 4 to enable semi-automated tag application to desired objects. In one embodiment, a semi-automatic encoder/applicator is created by integrating a single sensor device. The sensor responds to changes in light, capacitance, pressure, acoustics, or optical path length to a transport container. In another embodiment a suite of sensors are used to detect the attachment location of a commissionable transponder.

For example, changes in capacitance are detectable using certain QProx charge transfer capacitance sensors available from Quantum Research Group Ltd. of Hamble, England. Ultrasonic range sensors are available from suppliers such as muRata Manufacturing Co., Ltd. of Kyoto Japan under the trade name Piezotite. Optical path length sensors are available from Keyence Corporation of Osaka, Japan. Sharp manufactures a compact distance-measuring sensor GP2D02 that is responsive in the range from 5 to 100 cm. Thus, when a predetermined set of conditions is realized, the sensor triggers, enables, or selects a desired action. In one embodiment, proximity or contact of sensor suite with the targeted transport container causes a second type of Trigger Event, resulting in the commissioning and dispensing of a transponder by an encoder.

In other embodiments, sensor 42 is designed to determine the distance an encoder resides from an object that is to be tagged. Range information is acquired and processed in real time to determine if the encoder is in Close Proximity, Near, or Far from a transport container. In certain embodiments a controller is programmed to alter threshold distances between each range category and to associate a function with each range. In certain embodiments, range category Close Proximity is associated with transponder programming and application functions. For example, the range category Near is reserved for transponder verification and/or reading functions; and Far is reserved for bar code scanning functions to verify that bar code information aligns properly with RFID transponder data.

In further embodiments a sensor suite is responsive to certain colors or patterns and uses that information to instruct the placement of transponders or detect the correct locations for applying good transponders and separate locations for discharging bad transponders.

In further embodiments, optical sensor 105 is eliminated by sensing a tag's presence when the tag comes within the near field of antenna 102. The near field coupling characteristics are supplemented by forming an aperture in a shielding layer of the surrounding electronics enclosure 11a. The near field coupling and the aperture work cooperatively to form an encoding zone. Stray electromagnetic fields are prevented from reaching the unprogrammed supply of transponders by forming a partial faraday cage around the encoder's electronics cavity 11a. The partial faraday cage is preferably formed using a conductive nickel spray coating on the inside of interrogator's 100 plastic enclosure 11a. It is preferred that the cartridge housing the programmable tags does not require costly RF shielding as cartridge 11b is a consumable good while the electronics enclosure 11a remains for the entire lifecycle of the encoder. In some embodiments the conductive coating is prevented from chipping with an additional non-conductive spray or dip. The shape and characteristics of the encoding zone are controlled by leaving sections of the plastic enclosure 11a free of the conductive spray. As such, interrogator 100, the processor, and motor 104 are able to work together without optical sensor 105 to position and encode a partially peeled tag for removal from the release liner. In further embodiments optical sensor 105 is used to assist motor 104 and interrogator 100 to control the position of a programmable tag for encoding and removal.

Figure 11:
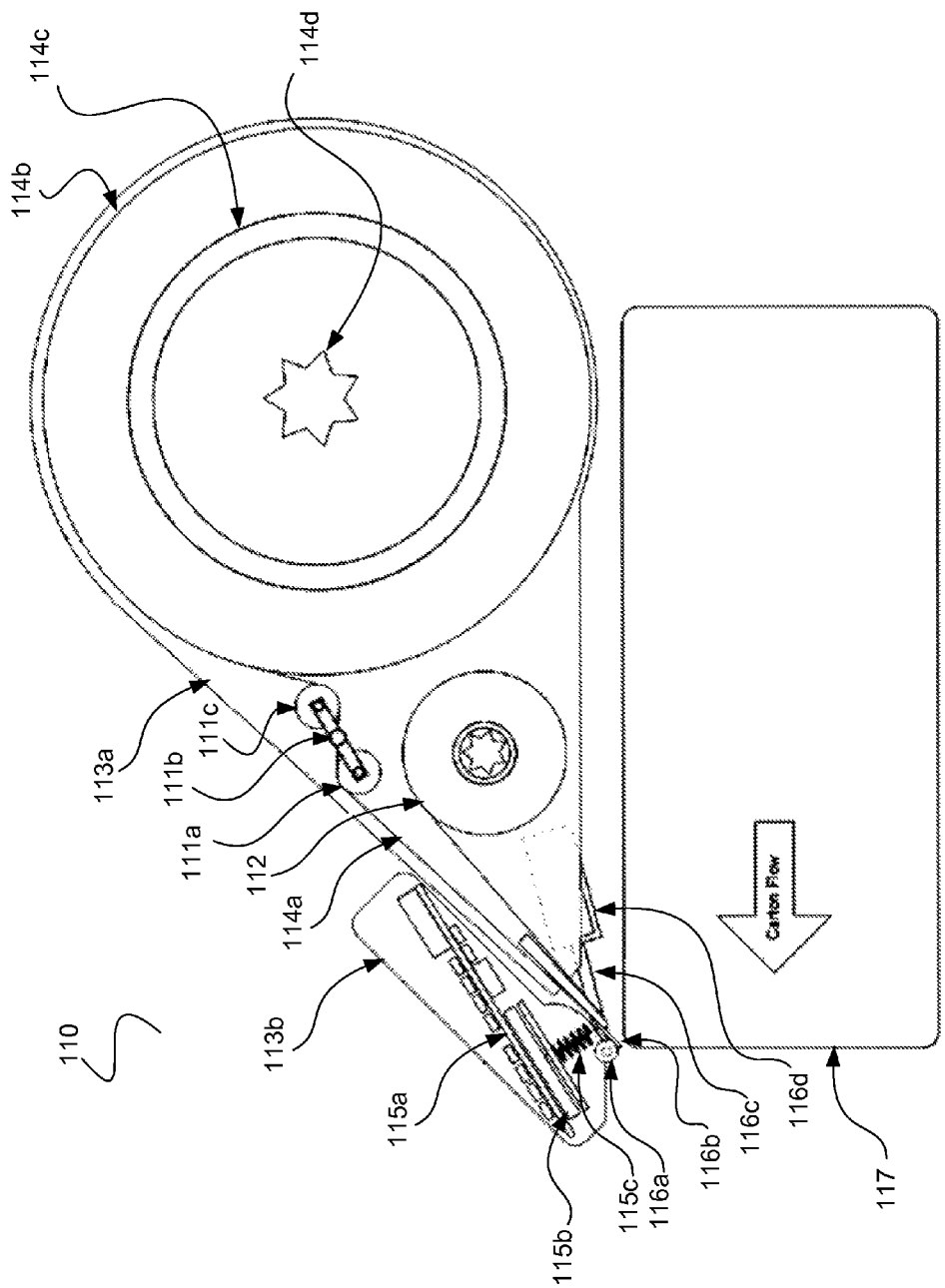
FIG. 11 is a fixed RFID tag applicator and cartridge according to one embodiment of the present invention.

FIG. 11 is a diagrammatic view of a fixed applicator assembly 110 comprised of applicator 113b and cartridge 113a. The housing of cartridge 113a preferably protects RFID tags and wireless sensors encased therein from unauthorized interrogation, ESD, mechanical damage, and in certain preferred embodiments the housing of cartridge 113a also protects tags from X-Rays and Gamma Radiation. In certain preferred embodiments, the housing of cartridge 113a contains regions of metal, carbon, conductive plastic, metal-plated plastic, or some other inexpensive, protective, mass-producible material. Applicator 113b and cartridge 113a are preferably mounted onto a supporting structure that is not illustrated in FIG. 11. A support structure enables applicator 113b and cartridge 113a to be positioned at a height above the flow of cartons and goods to be tagged. The support structure preferably affords lateral adjustments to align applicator 113b and cartridge 113a to a position on each carton or goods. A different mounting structure is used to operate applicators 113b and 113c in another plane, such as a vertical plane that is rotated 90 degrees from the horizontal plane shown in FIGS. 11 and 12.

Preferred embodiments of applicator assembly 110 maintains a controlled amount of tension in release liner 114a web by a variable torque brake/closed loop motor control assembly in combination with a low inertia tension device. Initial tension in the release linear will begin at the supply roll by monitoring diameter and/or low inertia tension device position. Motor actuation and/or brake torque will be adjusted as per the feedback device. The low inertia tension device will be used to provide a more consistent tension in the release liner in high speed indexing application. The low inertia device allows for quick start and stop indexing accommodating positioning necessary for tag processing at a high rate of speed at variable tag pitches. Feedback control instruments and mechanical control devices are preferred to be external with proper interface to reduce complexity of cartridge.

Preferred embodiments of applicator assembly 110 maintains a controlled amount of tension in release liner 114a web by a disk brake assembly and a constant tension device such as a dancer. Some common types of dancers are pivot arm, linear, or rotational. Rotational dancer 111b is comprised of rollers 111a and 111c that rotate around a common axis at dancer 111b. A disk brake assembly is preferably located behind hub core 114d wherein brake pads are mounted in a bearing housing and rub against an exposed face of a disk brake. Braking torque is controlled by a selected number of installed brake pads, all having a certain coefficient of friction between themselves the disk, and the force exerted by a spring working through a spring retainer pushing against a tension nut that is adjusted to achieve a desired amount of braking force. A recoil spring provides a consistent amount of tension in release liner 114a through hub core 114d and source roll 114b. The recoil spring also provides tension in release liner 114a when the drive motor is stopped or run in reverse for short distances.

Take-up roll 112 is prevented from rolling backwards through the use of a one-way bearing which consists of needle bearing within a bearing housing. Within a prescribed range of reverse torque, the needle bearing will jam, thereby preventing the tag roll from rolling in the reverse direction. Forward motion of take-up roll 112 is allowed on the one-way bearing when the motor is energized in the forward direction. A preferred embodiment utilizes a direct drive motor with position feedback.

Release liner 114a begins to peel from tag 116b at peel plate 116c when it is advanced forward past the distal end of peel plate 116c. In one embodiment, a sensor detects the location of tag 116b to control the movement and stopping position of the tags. Near field coupler 115c interrogates and encodes tag 116b. Near field coupler 115c preferably couples with tag 116b with a localized magnetic field, and with the least amount of electric field as is practical. Preferred embodiments of near field coupler 115c are comprised of a helical structure of wire. In preferred embodiments the wire is solid core magnet wire having insulation on the exterior surface. The major axis of helical near field coupler 115c is either vertical from the ground plane, or horizontal to it, parallel with the major axis of the antenna of tag 116b. Interrogator 115b can be of any shape, but is generally located in close proximity to near field coupler 115c and its associated ground plane.

Interrogator 115b is powered and controlled by a microcontroller integrated into encoder applicator control board 115a within a housing of applicator 113b. Interrogator 115b is commercially available from WJ Communications, Inc. of San Jose, Calif., SkyeTek, Inc. of Westminster, Colo., Sirit Technologies of Toronto, Ontario Canada, or ThingMagic, Inc. of Cambridge, Mass.

Certain preferred embodiments of applicator assembly 110 utilize tag attach roller 116a to apply a downward force on top of tag 116b at a precise time as determined by when roller 116a is retracted by cylinder 116d. Cylinder 116d is either electrically or pneumatically actuated. In preferred embodiments cylinder 116d is a solenoid. Roller 116a retracts only after tag 116b has been successfully encoded, and is synchronized with the movement of carton 117 to adhere tag 116b onto a preferred location of the face of carton 117 with a high degree of accuracy.

Figure 12:
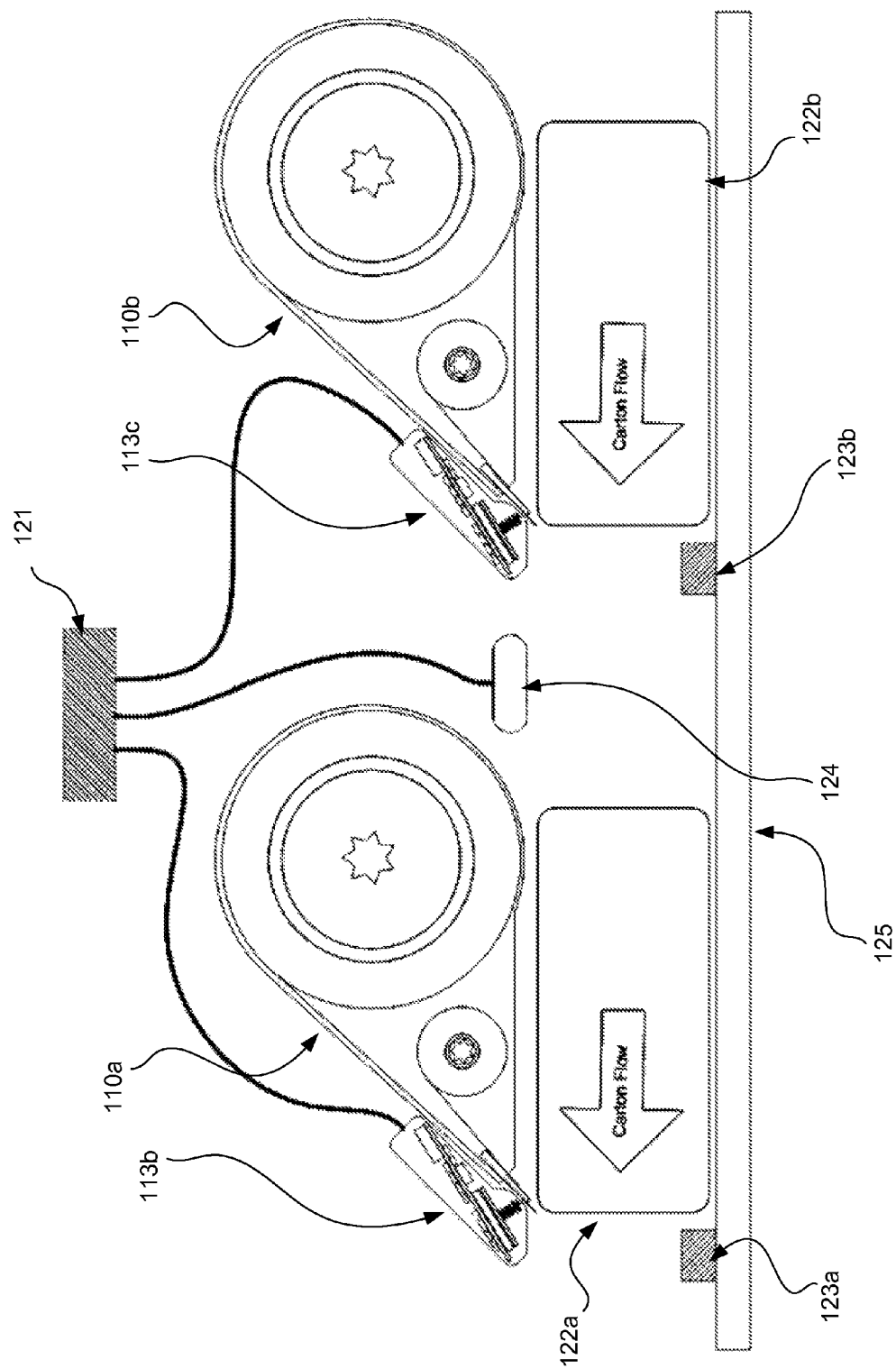
FIG. 12 is an array of cartridge-fed fixed RFID tag applicators according to one embodiment of the present invention.

Sensor 123a of FIG. 12 generates signals that correspond to when a carton passes a certain position on conveyor 125. Signals from sensor 123a are used to trigger applicator 113b to apply an encoded RFID tag onto carton 122a at a precise time and location while it is moving on conveyor 125. Signals from sensor 123a are routed directly into applicator 113b or alternatively through a device such as a programmable logic controller (PLC) that also maintains control of the motion of conveyor 125 and can take into account changes in conveyor velocity.

Cartridge 113a plugs onto fixed applicator 113b to replenish a supply of wireless RFID tags or wireless sensors. Source roll 114b is wound onto core 114c, and unwinds using release liner 114a as a leader onto take-up roll 112. Back tension is provided through a reverse torque or a brake at hub core 114d. Peel plate 116c holds tag 116b in a position within the magnetic field of near field coupler 115c.

For online applicators, a key benefit of this novel cartridge-based design is that the cartridges can be changed out without disrupting, halting, or reducing packaging line throughput. This is preferably accomplished by ganging together several cartridges to cooperatively work together to encode and apply tags when other cartridges in the system have been depleted. Certain preferred embodiments use several cartridges working together to deliver an aggregate throughput that cannot be achieved with a single cartridge. For example, one cartridge can deliver up to one tag per second, but two cartridges can deliver twice that throughput. Adding a third applicator and cartridge can add either additional throughput or a degree of redundancy to maintain line speeds when one applicator is unable to encode and apply tags.

Each cartridge of a fixed applicator system utilizes a tag transfer mechanism that peels and removes tags from a release liner and transfers tags one at a time to a target location on a carton or some other object while it is moving.

Controller 121 coordinates the encoding activity of applicator 113b and applicator 113c, drawing from tags housed in cartridges 113a and 110b respectively. Controller 121 assures that each carton that should receive an encoded tag actually does receive an encoded tag. A preferred means of sharing the encoding load reduces the carton-tagging rate (measured for example in units of cartons per minute) to a level that can be reliability maintained by an individual applicator 113b or 113c. A preferred embodiment utilizes applicators 113b and 113c to each apply encoded tags to every other carton, alternating as the cartons move under or next to them. The combined capacity of the pair is at best twice that of a single applicator. A rating of 60 cartons per minute per applicator can then be extended to 120 cartons per minute, disregarding downtime. In another preferred embodiment, three applicators provide a combined capacity of 120 cartons per minute, with the ability for any one of them to be briefly taken out of service for a cartridge changeover.

RFID interrogator 184 is used in certain preferred embodiments as a means of verifying that the applied tag is functional after being applied to carton 122b.

Preferred applicator 183 embodiments execute anti-virus code in a protected portion of memory that can only be modified by opening a secure electrical access panel 11d, attaching a special debug/download pod, and erasing the entire program before downloading a new program. Such capabilities are provided by microcontrollers from Freescale Semiconductors, Inc. of Austin, Tex. Another aspect of the preferred embodiment is that program updates to unprotected memory locations are made through a wireless download means using a trusted program operating out of protected memory. A trusted anti-virus program downloads and verifies that the downloaded program conforms to certain algorithmic rules. Anti-virus code scans incoming program updates to identify malicious code segments and/or to verify that a program has a predefined signature. A program signature can be identified by running all or part of program machine code through an algorithm that produces a required mathematical result. Any program that fails this test can be rejected as being corrupt.

Preferred embodiments of tag applicator 183 have the ability to execute one program while downloading and verifying another before transferring control to it. A preferred method is to load the new program and scan it either as it is arriving or after it has been loaded into a section of memory.

The protected memory preferably contains secret (private) keys 192a-d, secret codes 191a-d, secret algorithms, anti-virus scanning code, a unit serial number, and a program loader. The program loader is preferably invoked by a host command. Host commands are preferably ASCII commands or XML commands.

The general form of a host XML command is:

```
<item>
    <command="command"/>
    <type="type"/>
    <length="length"/>
    <data="data"/>
<item/>
```

Certain preferred embodiments use tags, transponders, or wireless sensors that are preprinted with certain symbols which may include: barcodes, an EPCglobal seal, or other identification marks. Preprinted symbols that carry digital information, such as a linear or two-dimensional barcode may reference a unique number or a data storage location on a network. A preferred method of encoding such a storage location is to use a uniform resource locator (URL). RFID tags located within or attached to cartridge 11b, 113a, or 180 preferably carry information that enables encoder 10, 110, or 183 to associate each tag with each uniquely and sequentially pre-printed barcode. In a preferred embodiment, the first tag to emerge from cartridge 11b is pre-encoded with data that describes the data that is encoded into the barcode that is preprinted on that RFID tag. Each subsequent tag is preferably encoded with data that is a logical progression from the previous tag, and in many cases is part of a consecutively numbered series. In another preferred embodiment, a more secure method uses a pseudorandom numbering sequence to enumerate the tags.

Tag encoder 10, 110, or 183 will read data from a memory partition within each tag that may include: a header, a total tag count field, a tag number (1 to about 1000), a cartridge identifier, a field that contains the running count of bad tags encountered so far in that cartridge, a field that contains the total number of bad tags in that cartridge, a field that tells the mobile encoder how to process the tags in this cartridge, a field that contains the cartridge conversion date and time, a field that identifies the conversion facility and machine number, a field that enumerates and links each tag to a bar code on the corresponding tag, check digits, CRC, or other error detection and correction methods. Certain preferred embodiments use asset identifiers that are programmed into the transponder memory at the chip foundry before dies are attached to antennae to form inlays. The primary advantage is processing speed.

In one embodiment, mobile encoders write data to the first and the last tags on a cartridge. The data shall be written to a special secure tag memory partition if possible. The stored data will preferably include: the unique PAD identification number, an operator identification number, the location, date, and time when it is provided by the host system, and an encrypted authentication code.

Operation of tag encoders disclosed herein may require support infrastructure that may not typically be in place in remote parts of the world where products are manufactured. As a minimum, the encoders require a long term supply of power. In the absences of line power, DC power can be made readily available through solar panels, fuel cells, or from a generator that is powered by fossil fuel or other hydrocarbon molecules. A preferred embodiment where terrestrial telephone, cable, or wireless services are available substitutes communications with a telephone, cable modem, or wireless interface. Preferred services may include dial-up modem connections, cable television modem connections, PCS, GSM, CDMA, TDMA, or other subscriber-based communications services.

One or more docking stations are provided for encoder 10 and others like it to acquire power and in some versions exchange data through wired connections. A preferred means of providing power and communications to Fixed Applicator Device 110 is through a Power-Over-Ethernet connection.

D. Interrogator Apparatus

Working as a stand-alone device, or combined with an encoder, certain embodiments of the present invention include an RFID transponder reader, also called an interrogator. The interrogator, in one embodiment, is a physically separate device that is solely in wireless communication with the encoder. In another embodiment the interrogator includes a wired connection to the encoder. In yet another embodiment, the interrogator connects to the encoder via an intermediate processor, such as a remote computer, or some other intermediate device. In yet another embodiment, the intermediate device is a shared processor in a physically integrated encoder/interrogator apparatus.

Regardless of the physical configuration of the interrogator, its function is to encode and/or verify a RFID transponder's (including wireless sensors) functionality. Certain embodiments use a mobile handheld reader to verify transponder functionality after carton attachment. Certain handheld readers also read bar codes that either partially or completely specify the data that is to be programmed into a transponder. Accordingly, an optical path from the interrogator to a location for reading bar code labels is used to identify certain information about the objects or containers that are to be tagged. Additional transponder encoding instructions and data is acquired through an integral network interface or a batch mode memory in the interrogator.

In certain embodiments, a shield structure incorporated in a combined interrogator/encoder prevents RF fields from interrogating or reprogramming RFID transponders yet-to-be-commissioned that are resident in the combined interrogator/encoder device.

Figure 28:
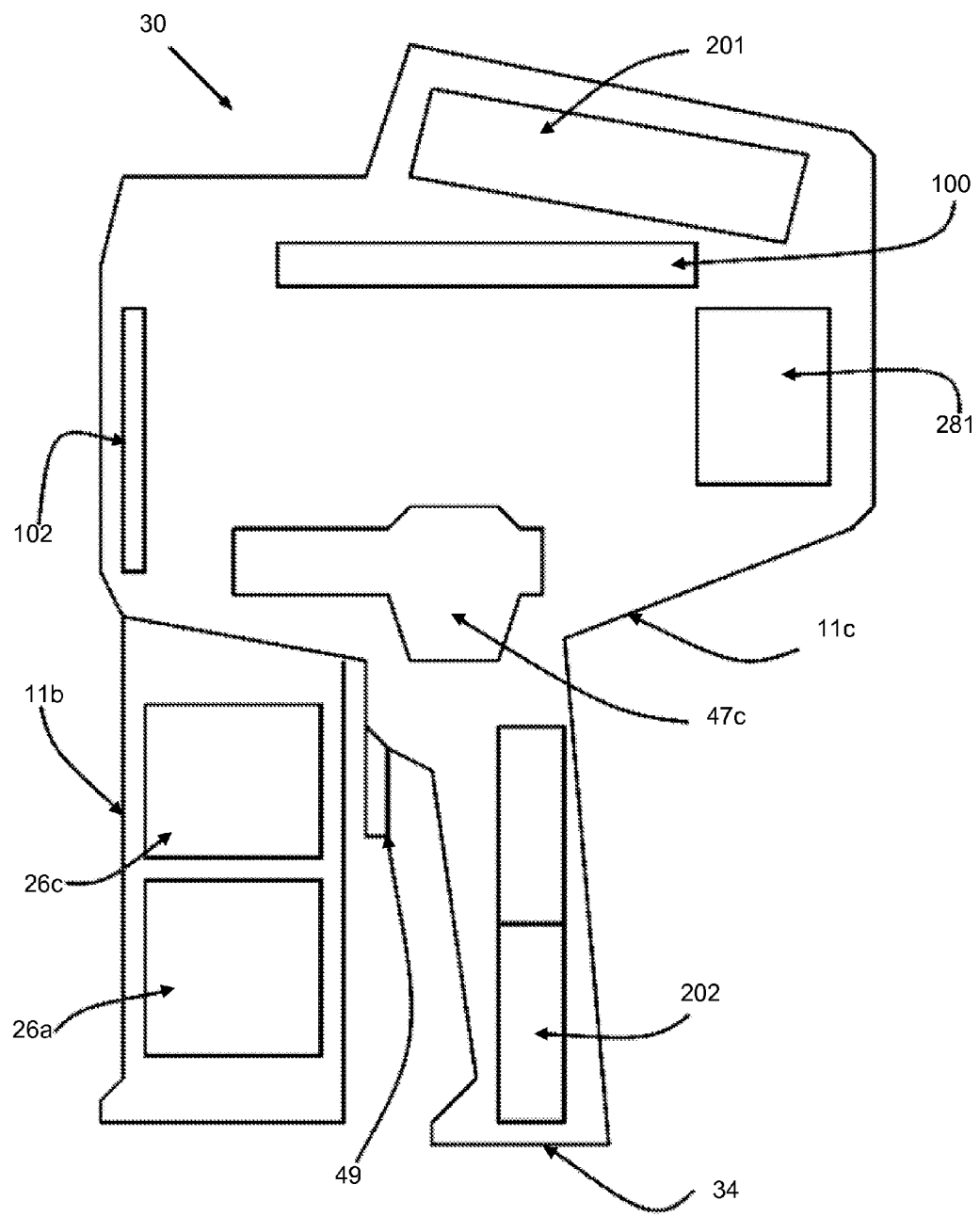
FIG. 28 is a schematic cross section view showing the electro-mechanical components of one embodiment of a mobile encoder.

In one embodiment, shown as a cross-sectional schematic in FIG. 28, a contact image sensor (CIS) 281 or a linear optical array is used to scan along the length of an RFID transponder before it is applied to a container. CIS 281 produces a video stream that is decoded and then interpreted and stored by an on-board Computer 201. CIS or a similar linear array sensor is capable of reading both linear and two-dimensional bar codes. In certain embodiments, CIS reads two-dimensional bar codes before attachment to inlay or transponder. The on-board computer creates a logical association between bar codes and the commissioned RFID transponder. Encoder 30 reads and associates all bar code symbols on a single segment with the RFID transponder or inlay adhered to it.

When an operator pulls the trigger 49, which is either a mechanical trigger or an electro-mechanical device, the on-demand commissioning of the RFID transponder occurs and nearly simultaneously is pressed against a container within a fraction of a second. In certain embodiments, mechanisms internal to encoder 30 transfer mechanical force to the RFID transponder tag through the use of air, springs, motors, plungers, elastomers, or other energy storing or delivering methods. Reloading of the next tag (next transponder) and readying of the system are performed within a time interval that is acceptable to the operator and enables a high degree of productivity for tagging cartons, pallets, or other transport containers.

In certain embodiments of a combined interrogator/application, a trigger 49 couples to an electrical switch having one or more stable positions that are detectable by a controller. In certain modes of operation trigger-switch state is coupled with range information from a sensor suite 42 to execute functions at predetermined ranges at predetermined times. The result is a trigger that functions based upon detected range from a container or other object of interest. This advantageously improves operator efficiency and productivity as one trigger executes several different functions that are typically involved with RFID tagging including the tagging of bar-coded cartons that have been selected to receive wireless sensors.

Verification of bar code occurs either before or after an RFID transponder is commissioned and the tag applied to the container by merely stepping back to a point where the sweep angle of a laser beam or field of view of an imager can read a bar code label. In certain embodiments ranges shorter than that, but not in Close Proximity, are used for sweeping a radio frequency interrogation signal across the faces of multiple cartons to assure that the correct tags, the correct number of transponders, and the correct data within that transponders were all properly programmed.

In certain embodiments Close Proximity range is reserved exclusively for programming, applying, and verifying one transponder, all in a single pull of trigger. In other embodiments, the interrogator includes programmable conditions that enable Trigger Events to interact with external devices or nearby equipment. For example, at a predetermined range from the interrogator, activation of the trigger causes the encoder to transmit a coded signal to an external device as an indication of an operator action: at a Far-range the signal to requests an external device to read a bar code and the bar code information is decoded and transmitted back to encoder. In another embodiment, decoded barcode information is processed by a portable data terminal (PDT), a vehicle mount terminal, or other computing device.

The on-board computer 201 controls the operation of the RFID Interrogator Module 100 to read, write, and verify RFID tags, inlays, transponders, and wireless sensors that are applied or are within range of the interrogation fields produced by antenna 102. The encoder 10, capable of reading multiple RFID transponders near it, can, in certain embodiments, produce a linearly polarized radio field via the internal antenna 102. In another embodiment, the internal antenna produces a horizontally polarized RF field. A commissioned transponder can be read both before and after it is applied to a transport container. When multiple transponders are within the interrogation field of the encoder 10 with an interrogator module 100 the on-board computer 201 determines which transponders are commissioned and dispensed versus those transponder that have not. In certain embodiments, the on-board computer maintains records of transponders recently applied in order to properly determine how to interact with each transponder in the field of the internal antenna or other antennae under the control of RFID Interrogator.

In one possible embodiment, the interrogator/encoder utilizes preprinted information on a set of RFID transponders. The pre-printed information includes one or more logos, an EPC-global Seal, and other informative alpha-numeric or bar-code data. Certain preferred embodiments of encoder/applicators 10, 30, and 40 correlate RFID tag data with data encoded in certain preferred bar codes. In certain preferred embodiments, applicators such as applicator 10 read the bar code preferably using a sensor such as CIS 281 as the tape is unrolled from a spool. In certain other preferred embodiments, an RFID tag is located on cartridge 11*b* and contains a numerical value that is directly or indirectly representative of the numerical values optically encoded into the bar codes preferably at least indicating the starting numerical values of a number sequence. Other additional information is also encoded in the RFID tag in certain preferred embodiments, including the number of tag positions, the number of good tags, the ending sequence number, the date, time and place of tag conversion or other preferred commercial, logistic, or manufacturing information. In certain preferred embodiments of applicators 10, 30, or 40 certain wireless tags attached to cartridge 11*b* are capable of being read. In certain preferred embodiments the interrogator such as interrogator 100 is capable of reading an RFID tag mounted to the loaded cartridge, and is also preferably capable of filtering out its response to interrogation or programming of RFID tags.

Certain embodiments have a motorized tape drive and dispensing system. Certain embodiments contain some or all of the following: a rechargeable battery, an operator display, a wireless interface, a network stack, an IP address, a PCMCIA port, a Compact Flash port, a USB cable, a serial cable, a dock port, a window to allow the operator to view the transponder attachment process, or a bar code scanner.

One suitable interrogator includes model MP9311 available from Sirit Technologies of 1321 Valwood Parkway, Suite 620 Carrollton, Tex. 75006, USA. Other RFID transponder or wireless sensor interrogator modules with other feature sets are also possible for use in the interrogator/encoder.

FIGS. 28 and 3 show one possible interrogator/encoder 30 according to the present invention. The interrogator/encoder 30 comprises a housing 33 having a user input device 32, such as a key pad or key board, and a user output device, such as an LCD screen 31, for displaying optically scanned label data, RF interrogated data from a transponder, and other information including on-board diagnostic functions, bios status, and external information provided from a remote computer as sent over a wireless network, for example. A handle structure 34 enables point-of-use deployment while cartridge 11*b* enables on-demand commissioning of RFID transponders, which are dispensed from the transponder port 36. In this embodiment, an integrated YAGI antenna 102 creates a large forward-looking main lobe of radio frequency energy for interrogation of commissioned RFID transponders. The internal antenna also produces side lobes of RF energy that although attenuated from the main lobe by several dB, couple enough power into nearby readied transponder to interrogate and write to it.

As further depicted in FIG. 4, a reflector 41*b* passively reflects RF signals from an upper side lobe downward toward readied tag 43*c*. Backscatter from tag 43*c* propagates to both antenna 41*c* and reflector 41*b* for processing by the interrogator. Having such an antenna embedded in PDT 41*a* and mounted to the structure of the encoder housing enables the PDT 41*a* to encode and verify readied transponder 43*c* while commanding the encoder to commission and dispense a tag when a particular Trigger Event or a predetermined range status change occurs.

An antenna, or alternatively, leaky coax 43*e* or a near-field coupler is located outside of protective enclosure of cartridge 11*b* in a location very close to the tag attachment zone in front of a tamp head or tag application roller and holding rollers 43*d* or hammer 43*b*.

In some embodiments antenna 44*a* is a patch antenna with a radiation pattern toward the tag attachment zone. In other embodiments the antenna is a near field coupler. Alternatively, leaky coax, a type of coaxial cable having slits, slots, or perforations that allow radio frequencies to leak in or out, is used in encoders according to the present invention. A coupled-mode cable, which does not radiate as well as radiating-mode cable, is constructed with closely spaced slots in a corrugated outer conductor. Radiating-mode cable typically has a foil outer conductor with non-uniformly spaced slots arranged in a periodic pattern. Coupled-mode cable is a slow-wave structure. In free space its external fields are closely bound to the cable and do not radiate, except for minor end effects according to "Prediction of Indoor Wireless Coverage by Leaky Coaxial Cable Using Ray Tracing" by Samuel P. Morgan of Bell Laboratories, Lucent Technologies.

In certain embodiments an interrogator drives a signal into a leaky coax that is terminated in a purely resistive load of about 50 ohms. An RF-switch selects between radiating and non-radiating loads including an antenna or leaky coax and, therefore, avoids mismatched load impedance.

In other embodiments internal antenna 44*a* or 43*h* is a patch antenna with its strongest lobes oriented toward the tag holding and placement area in the region of holding rollers 43*d*. Antenna 43*h* or leaky coax 43*e* work with an interrogator to produce electromagnetic fields to interrogate, program, and verify wireless sensors. Shield 45*a* prevents interrogation or programming of RFID transponders until they arrive at separation roller or tag peel edge 43*i*. A reflector is used in certain embodiments to reflect RF radiation toward a readied transponder. In the event that verification fails, the operator is informed that the bad tag (or inoperable transponder) is to be discharged onto a surface of a third object other than the encoder or the transport container, for post-mortem analysis.

Referring to FIG. 4 drive motor 47*c* is preferably located inside the center of source reel 26*c* within the circular walls of applicator housing 47*b*, around which cartridge 11*b* is nested when mated to interrogator/encoder/applicator 40.

Motor 47*c* is mounted to the structural frame of applicator 40 and preferably transfers mechanical power to certain drive points preferably using gears, belts, or drive shafts within applicator housing 44*b*. In certain preferred embodiments of applicator 40 certain preferred drive points include take-up reel 26*a*, source reel 26*c*, or hammer arm 43*b*.

Trigger 49, preferably embedded within trigger handle 34 is actuated by an operator, preferably causing a Trigger Event. In certain preferred embodiments, there is more than one kind of Trigger Event. In certain preferred embodiments of applicator 40 certain types of either mechanical or electromechanical actuators are preferably used to cause hammer mechanism 43*b* to trip, being driven toward readied tag 43*c*, through port 36 for placement on a transport container at the face of bulkhead 44*b*.

Another means of electromechanical actuation from a Trigger Event initiated by sensor suite 42 is illustrated in FIG. 4 whereby DC motor 43g runs in a reverse direction causing ratchet 43f to become disengaged, allowing hammer 43b to accelerate toward tag 43c due to the torque exerted by spring 43a. Hammer 43b passes between holding rollers 43d to press tag 43c against the face of a transport container.

Interrogator 100 is preferably capable of working with controller 48 to recognize which tags have been recently programmed or applied so as to filter out their response to interrogations of other tags, especially those tags that are being prepared for attachment. Interrogator 100 is preferably capable of modulating its transmitted radio power to affect the range and signal to noise ratio of its coupling to wireless tags.

E. Method of Inlay Conversion

Figure 21:
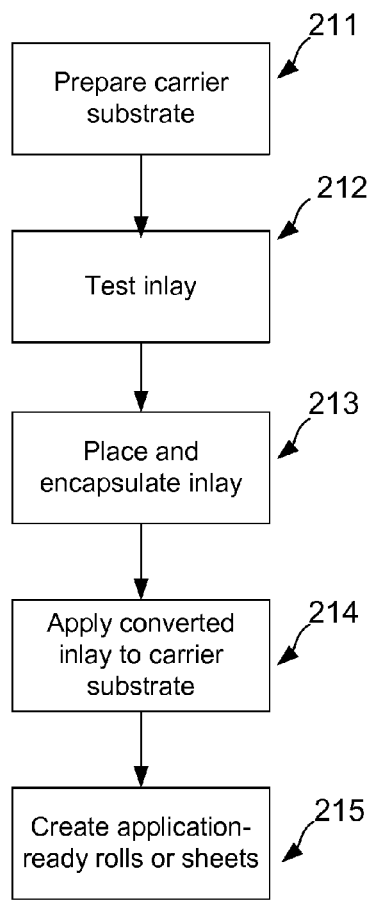
FIG. 21 is a flow chart of a first method according to the present invention.

FIG. 21 shows one method according to the present invention and includes preparing a carrier substrate (Block 211) for use in an RFID transponder or in a wireless sensor that includes both an RFID transponder and sensor device. This process contemplates utilizing adhesive-backed packing tape or some similar material suitable for adhering a commissioned RFID transponder to a container or other object of interest. Certain embodiments for this step include machines to cut large rolls of mesh or net into numerous small rolls with the desired width, length, and core diameter. For example, a supply-roll of stock mesh or net measures about 14-feet wide and about 5000-feet long, rolled onto a core. In one embodiment the supply-roll must be trimmed to fit the width suitable for use in a mobile encoder 10 or similar encoder/interrogator as described in this disclosure.

For certain embodiments, the carrier substrate width is about the length of a simple UHF dipole inlay, as shown, for example, in FIG. 16. In one embodiment the carrier substrate width measures about 4-inches. The length of the carrier substrate depends on many factors including the target cost per transponder of the cartridge and all of its components. Other factors that determine the length of the carrier substrate include the target size and weight of the cartridge and/or the mobile encoder. A possible machine that converts large supply-rolls into smaller ones, in one embodiment, consists of a stand-alone industrial machine. However, in other embodiments, the trimming function is part of an integrated machine.

Block 212 represents the testing process of an RFID inlay comprising, at least, an RFID chip and antenna device. The testing, or interrogation, of the inlay, in one embodiment, includes an interrogator and an antenna or a near field coupler, which read the inlay. This process further includes monitoring various parameters such as activation energy, backscatter signal strength, sensor performance, and other indicators of the quality of the RFID transponder or wireless sensor. Any transponder or tag that does not meet certain minimum performance criteria is discarded. Good transponder or tags are subsequently programmed, encoded, or commissioned with new information relating to the associated object of interest. Such information resides or stores in non-volatile memory within the RFID inlay. Inlays that fail to perform to adequate levels of performance are immediately separated from the process.

Block 213 represents a third process step consisting of applying and encapsulating good inlays in an encapsulation layer or encapsulation zone of the RFID transponder. One possible encapsulation layer comprises a packing tape constructed from pressure sensitive acrylic adhesive and backed by a substrate layer of bi-axially oriented polypropylene film. In certain configurations such packing tapes provide up to about 25,000 volts of ESD resistance when properly applied in about 0.002-inch thick layers of encapsulation. Other packing tapes, available in thicknesses of about 0.001-inches, when combined in layers provide higher ESD voltage resistance ratings. The inlay substrate contributes additional ESD resistance in certain contemplated configurations.

Block 214 represents another process step consisting of applying the converted RFID transponder to an interposing transport media. Such media preserves the tackiness of the exposed adhesive. One possible adhesive includes a pressure-sensitive adhesive, which adheres to most surfaces with very slight pressure and retains tackiness above their melting point of about negative-65 (−65) to about negative-90 (−90) degrees centigrade. In another embodiment, silicone-based release liner is used to transport and preserve pressure sensitive adhesive tags and labels. In other embodiments, the transport media includes utilizing air pockets bounded by regions having tensile strength such as fibers: for example, plastic or metal fibers. Certain plastic resins have a low surface energy and prevent strong adhesive bonds from forming and are bound together to form a mesh or net. Mesh (or net) constructions offer a means of handling converted tags without allowing a substantial percentage of the available adhesive to make contact with any other solids until the tag is commissioned.

Block 215 represents another process step consisting of winding converted transponders onto a spool with the interposing transport media. The core diameter, number of transponders, layer thickness, the thickness of any dielectric foam spacer layer, and outer diameter are all optimized for efficient, economical, and convenient deployment in transponder commissioning processes disclosed herein. Finished spools are packaged in a manner to prevent ESD damage. Certain enclosures include anti-static bags, foil-lined cartons, metal plated cartridges, and carbon-impregnated plastic enclosures. Certain enclosures are reusable. Certain enclosures of application-ready rolls or Z-folded transponders having low energy interposing transport media mate directly with encoders as described in this disclosure.

F. Method of Tagging Containers

Figure 22:
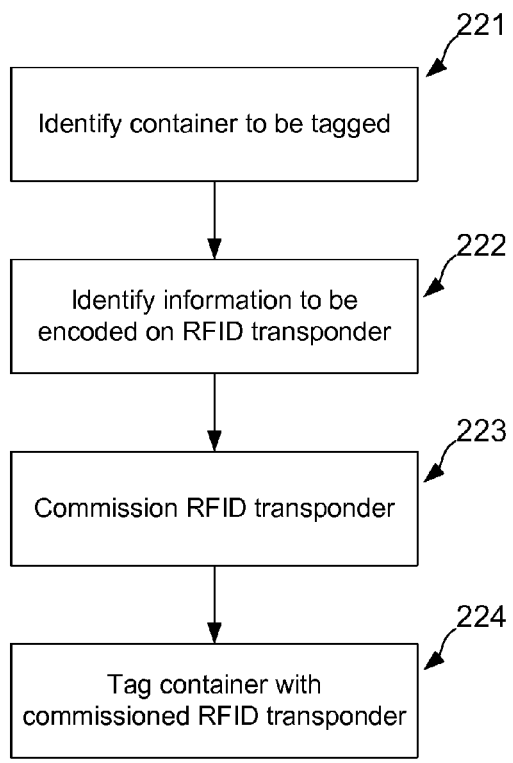
FIG. 22 is a flow chart of a second method according to the present invention.

FIG. 22 is a block diagram representing a second method according to the present invention including applying RFID transponders to objects of interest. One suitable object of interest comprises transport containers such as corrugated cartons or shrink-wrapped cases on a shipping pallet, which is inadequately addressed by the prior-art, particularly for solutions for manually operated automatic encoding and attachment to a container.

Block 221 represents a process step including the identification and selection of a container to be tagged with an RFID transponder or wireless sensor. In one embodiment this step includes a manual selection and verification processes that consists of manual handling, visual sighting, and scanning bar codes with a hand-held optical reader device. This method contemplates that a transponder encoding scheme is ready in advance and synchronized with a pick list, customer purchase order, advanced shipping notice, and other such records to assure that goods are properly moved and accounted for.

Block 222 represents another process step of identifying the information to be encoded, and may be included in the step represented by Block 221. In this step (Block 222), an operator uses a bar code reader or an encoder/interrogator of this disclosure. Alternatively, the operator may receive instructions delivered to a hand-held PDT or other mobile data terminal connected to a wireless network. This information is delivered to an encoder, such as encoder 10.

Block 223 represents another process step whereby, using a mobile encoder, the operator then commissions an RFID transponder with the information of the previous step (Block 222). Optionally, successful commissioning of the RFID transponder is verified by the encoder. In one embodiment, the encoder tests the next transponder and determines if it is operating within certain predefined specifications including parameters such as activation energy, backscatter signal strength, sensor performance, and other indications of the quality of the transponder. If the encoder determines that the transponder is not likely to result in a successful transponder deployment due to either physical or electronic deficiencies or abnormalities, then the operator is informed and the failed or bad transponder is discarded automatically or when an operator pulls a trigger under an operator-acknowledged transponder failure condition.

This step (Block 223) also includes processes to read or determine by dead reckoning the information encoded into certain preprinted optically encoded symbols on the outward facing non-adhesive surface of the adhesive tape. In certain embodiments the adhesive tape is printed with information. In other embodiments the printed information is a machine-readable symbol such as a bar-code symbol. For example, one or more machine-readable symbols are read when the tape is prepared for use in an automated encoder or, alternatively, during the inlay conversion process and conveyed to an encoder through other data storage means, such as an RFID transponder. In one embodiment, an information encoding method uses either one-dimensional or two-dimensional bar codes. In some embodiments a linear imager is used to read either linear or two-dimensional bar codes as the tape is being unrolled from a spool. Some encoding schemes preprint machine-readable symbols at regular intervals along the length of a roll of adhesive tape. In certain embodiments the spacing of the preprinted symbols is at an interval of one half of the nominal length of each section of adhesive tape. In certain embodiments, the encoded information is used as a reference to one or more data storage locations. In other embodiments the data storage locations are accessible through a computer network. In some embodiments, the encoded information is a series of sequential numbers. Information relating to data stored in the RFID transponder is stored in data storage locations that are referenced by one or more of the preprinted symbols. In an alternative embodiment more than one type of machine-readable symbols can be read from the surface of a segment of tape. In certain embodiments, more than one machine-readable symbol is used as a reference to the same or closely related data records of information stored in the RFID transponder or inlay, and either can be successfully used to access stored data.

In some encoders used in this step (Block 223) a Trigger Event occurs, which results in the verification that a particular commissioned RFID transponder has been tagged and associated with a specific container. This Trigger Event occurs, in certain embodiments, when an operator pulls a trigger on the encoder. In other embodiments the Trigger Event occurs when certain sensors detect preprogrammed conditions relating to the proximity of the encoder face to an object that is to be tagged.

Finally, (Block 224) the operator applies the RFID transponder on the container and, thus, commissions the transponder. In certain embodiments, the location of the targeted placement of the RFID transponder or wireless sensor on the container is stored in a database, which is referenced or pointed to by information that is stored in the memory of the encoder. In one embodiment, the operator holds the encoder against the face of the container based on the tagging requirements for that particular container. The tagging requirements including the location and orientation of the RFID transponder to be placed is conveyed visually or aurally. For example, the operator receives visual information via a screen or display on the encoder. In certain embodiments, physical indicators are attached to the encoder and extend from its body in a direction and manner so as to assist the operator in the positioning of the transponder onto the carton. In other embodiments, transponders are applied to the interior of a carton, before it is sealed.

G. Method of Commissioning RFID Transponders Using a Mobile Applicator

Figure 23:
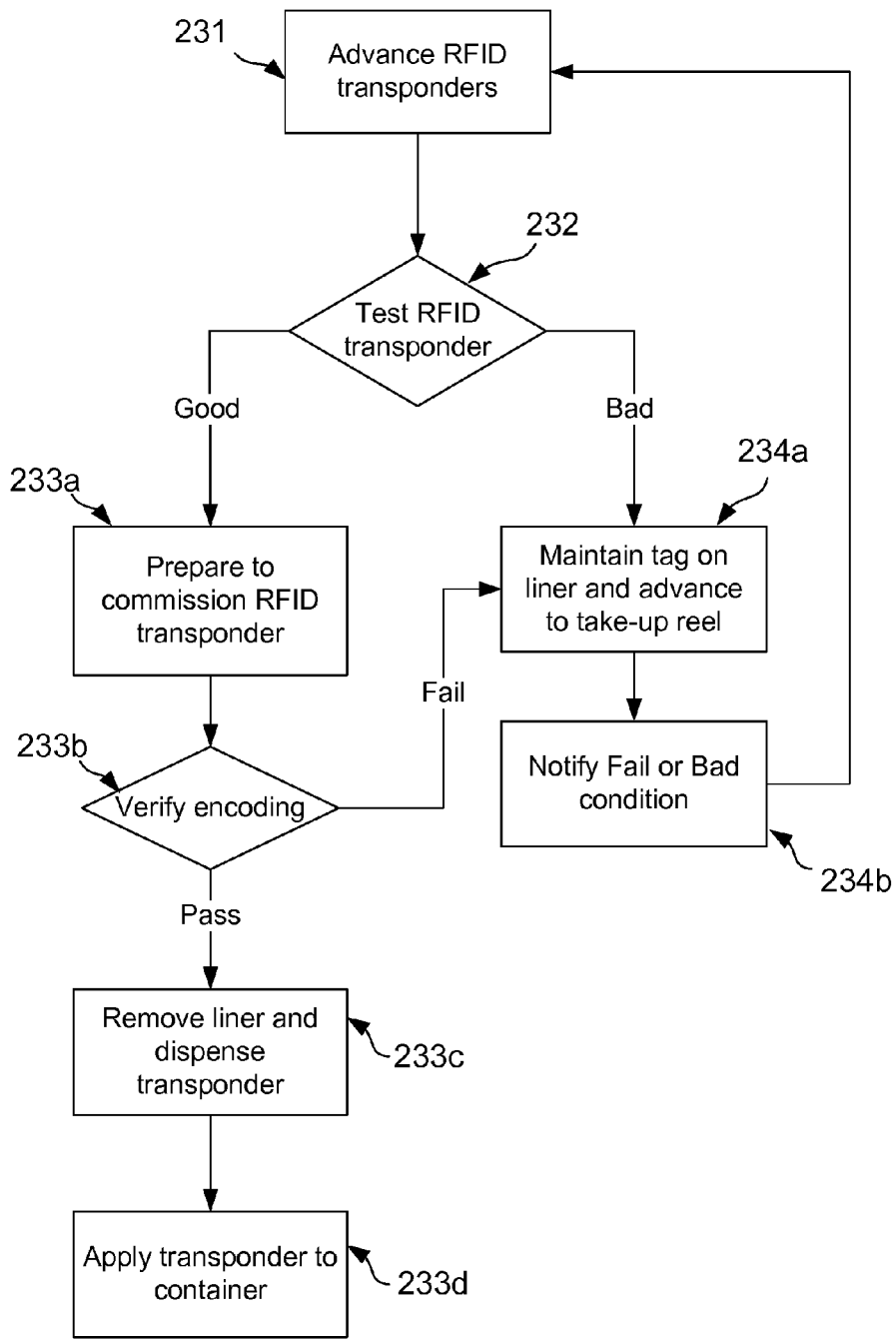
FIG. 23 is a flow chart of a third method according to the present invention.

FIG. 23 is a block diagram showing a method according to the present invention for commissioning RFID transponders using an encoder, such as the encoder 10, couples to a cartridge or protective enclosure containing a plurality of RFID transporters releaseably mounted on a transport sheet or roll. The encoder enables the roll of RFID transponders to advance one position (Block 231), placing the Next Tag in a test 1 position. The Next Tag is tested (Block 232) to ensure that it performs within predetermined parameters such as activation energy, backscatter signal strength, sensor performance, and other indications of the quality of the transponder. One possible method includes encoding a transponder using only a minimal amount of radio-frequency energy. Since transponder encoding requires more energy than reading a transponder, this low power test constitutes a basic test of both minimal activation energy and backscatter signal strength.

An RFID transponder that fails this test (Block 232) results in a "Bad Tag" status and proceeds to the take-up reel of the encoder (Block 234a). Thus, any failed transponder remains captive in the cartridge and cannot be released from the encoder by an operator. Optionally, the operator is notified of the failed transponder so the operator can request a newly encoded transponder (Block 234b). However, in one embodiment, the notification step occurs automatically, and a newly encoded next transponder is generated without input from the operator.

Block 233a shows that a "good" transponder is positioned in the encoder for the encoding process. The RFID transponder that passes the test 1 position is commissioned with predetermined data based on the container to be tagged. Methods of obtaining, storing, encoding, and commissioning this information on the RFID transponder are discussed elsewhere in this disclosure.

The commissioned transponder undergoes a verification process (Block 233b) to determine if the intended information was successfully encoded on the RFID transponder. Certain embodiments combine the verification step with the encoding step to gain operational efficiencies. If this verification test results in a fail condition, the transponder remains in the encoder and ultimately winds on the take-up reel in the cartridge for subsequent post-mortem failure analysis.

Block 233c represents a pass condition. The encoder removes the commissioned RFID transponder from the transport web or release liner, enabling the operator to retrieve the transponder from the encoder and apply the transponder to the container. In an alternative embodiment, the operator or a fixture holds the encoder against a surface of the container and the encoder places the commissioned RFID transponder directly on the container without operator intervention.

H. Method of Providing RFID Transponders to an Encoder

Figure 24:
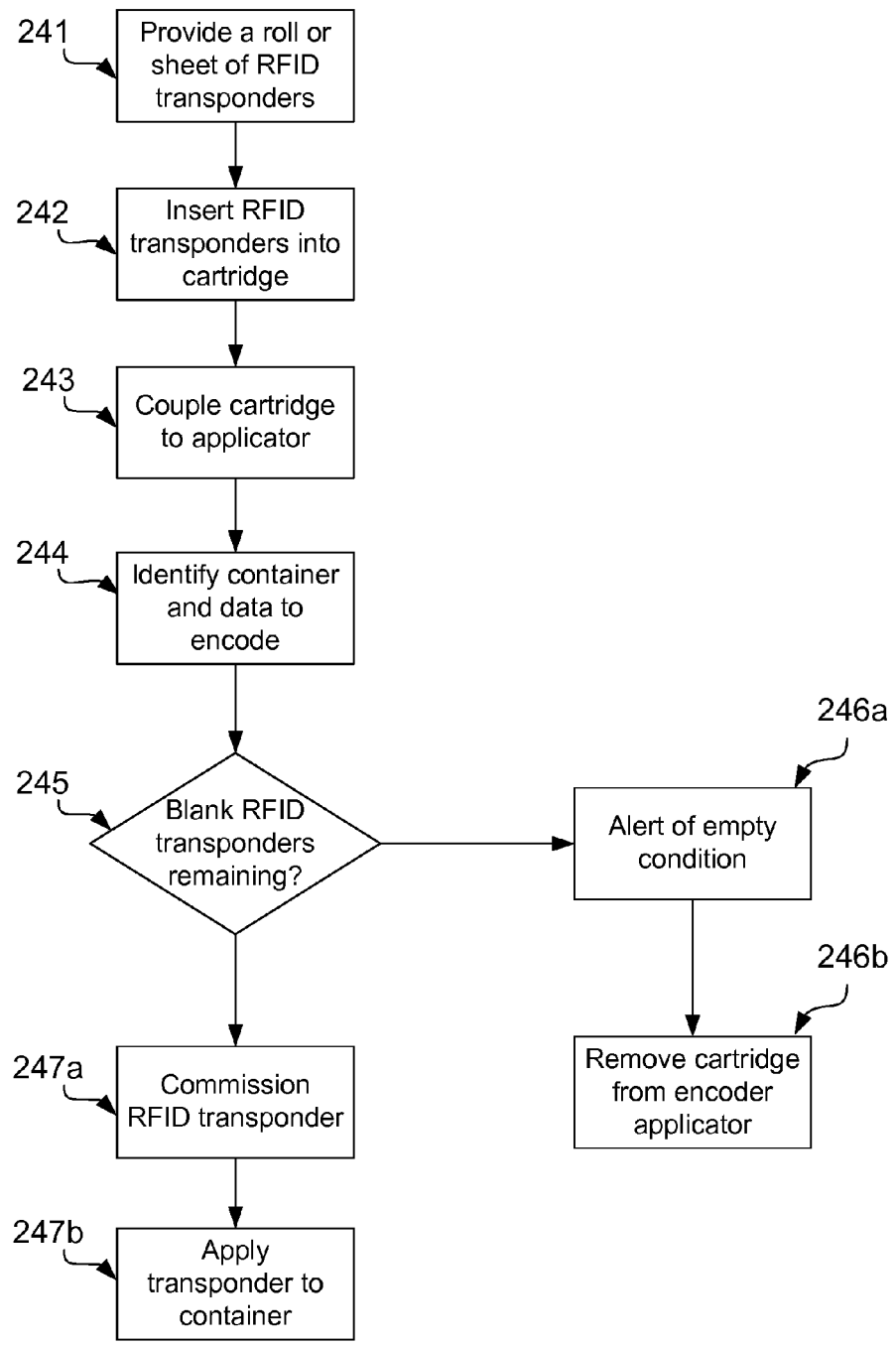
FIG. 24 is a flow chart of a fourth method according to the present invention.

FIG. 24 is a block diagram showing another method according to the present invention. One step, represented by Block 241, includes providing suitable RFID transponders such as the transponder 25 of FIG. 13, which are presented on a sheet or roll, such as sheet 51 of FIG. 15.

Block 242 shows the process step of inserting the roll of RFID transponders into a cartridge of an encoder such as cartridge 11b of FIG. 1. Steps 241 and 242 are ideally suited for off-site repairs and replacements of cartridges. Accordingly, a customer may send a used cartridge to a repair facility, enabling the cartridge to be recycled.

At a point-of-use location, such as a customer's warehouse or packaging facility, a fresh cartridge full of blank, or non-commissioned, RFID transponders attaches to an encoder adapted for such use (Block 243) and is used normally (Block 244), as previously described herein, to identify containers and data to encode on an RFID transponder. Prior to encoding, (Block 245) the encoder verifies that a non-commissioned transponder remains in the cartridge. If such a transponder is available (Block 247*a*) the RFID transponder is commissioned and in certain embodiments applied to the container (Block 247*b*) by means previously disclosed herein. If the cartridge is empty (Block 246*a*), the operator is alerted by various known means described herein or otherwise known by those skilled in the art. And, the cartridge is removed (Block 246*b*). The removed cartridge is sent to another location, a recycling, re-use, repair, or re-building center that is either on or off-site, or is discarded.

I. Method for Recycling Used Cartridges of RFID Transponders

Figure 25:
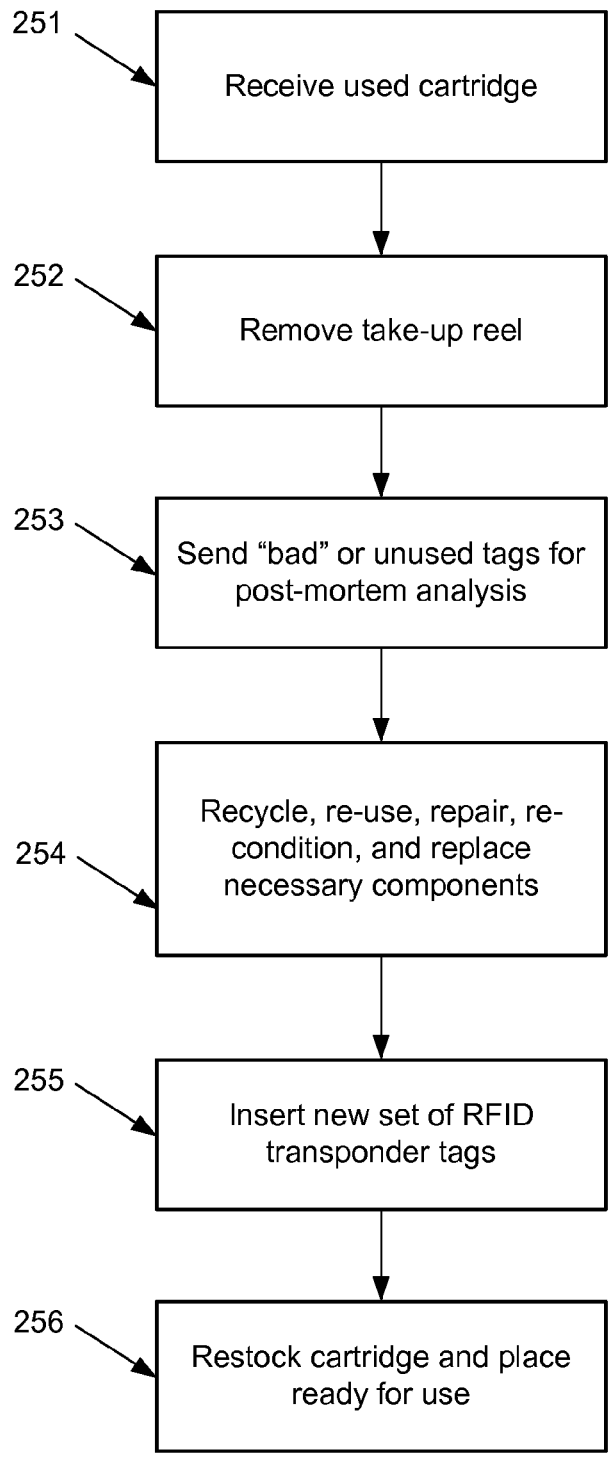
FIG. 25 is a flow chart of a fifth method according to the present invention.

FIG. 25, a block diagram, shows a method for recycling cartridges from, for example, a process similar to the one shown in FIG. 24. A repair center receives the used cartridge (Block 251). In one embodiment, the repair center is off-site from the customer, and allows specialized repair, reconditioning, re-use, recycling, and replenishment to provide cost-effective and environmentally sensible replacement cartridges.

In certain embodiments, a protective enclosure and RFID transponder recycling center reduces the amount of waste associated with enabling the convenience of tagging and safely handling RFID transponders and devices such as encoders or interrogators. For example, plastics and silicone are non-biodegradable materials that are suitable for recovery, re-use, and recycling. Certain plastic parts are disassembled, hub-cores are recycled for paper waste, and silicon-coated release liner is accumulated and separated from the recyclable (re-pulpable) paper for proper handling, recovery, and disposal—if needed. In such an embodiment, a customer sends the spent protective enclosure, such as the cartridge 11*b*, to an off-site recycling facility. The spent cartridge is replaced by either a new (virgin) cartridge or a refurbished cartridge, as appropriate. And such replacement cartridge is replenished with blank RFID transponders.

In step 252 take-up reel 72 is removed from cartridge 11*b*. In step 253 bad tags are preferably analyzed to determine the cause of failure. In step 254 any components that can be reused are retained as reusable parts, or if necessary are reconditioned before they are reused. In step 255 a new set of RFID transponders is loaded and sealed into cartridge 11*b*. And finally in step 256 cartridge 11*b* is stocked into inventory, ready for use.

Recycling continues with the RFID transponders as well. In certain embodiments, the RFID transponder 25 is configured and adapted for re-use. Accordingly, the data is wiped and re-coded as appropriate. In other embodiments portions of the RFID transponder are recycled. For example, the aluminum antenna separates from the encapsulation layer and is recycled. The paper stock is recovered and re-pulped.

In certain embodiments, replenishment of empty cartridges or magazines is performed as a service at a customer's site such as a warehouse, distribution center, packing plant, 3PL logistics center, or a manufacturing plant.

Figure 26:
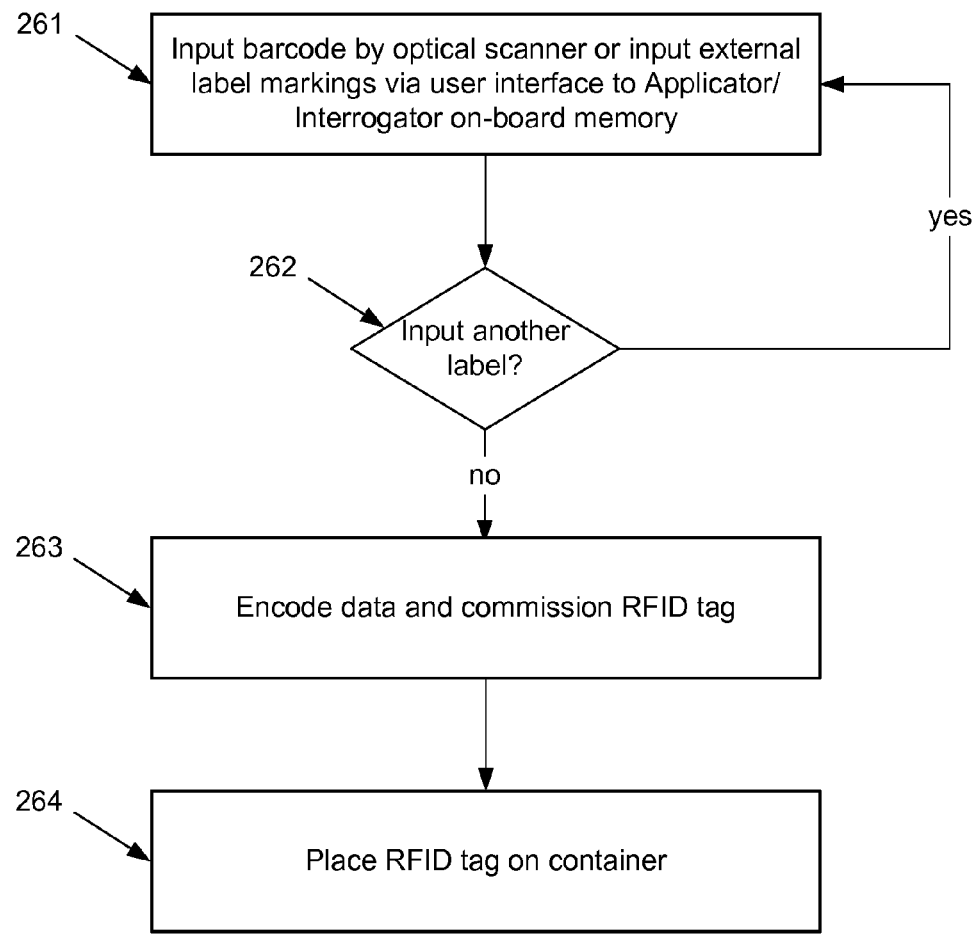
FIG. 26 is a flow chart of a sixth method according to the present invention.

FIG. 26, a block diagram, shows another method according to the present invention and consists of an algorithm for determining when an RFID transponder is commissioned based on predetermined criteria. For example, a shipping container typically includes a mixed lot of products. Accordingly, several different product-identifying barcodes are serially scanned (Block 261) until an end of condition event occurs (Block 262). This end of condition event may be queried after each scan or provided to an interrogator/encoder based on a supplied heuristic (i.e. volume, weight, etc.), pack list, or other customer-driven data.

Once all data is compiled and stored on the encoder, an RFID transponder is commissioned and encoded with the data or a logical pointer to a storage location of the data (Block 263). Then, it is applied to the container (Block 264) by means discussed previously herein.

While the invention has been particularly shown and described with reference to certain embodiments, it will be understood by those skilled in the art that various changes in form and detail may be made without departing from the spirit and scope of the invention.

We claim:

1. An RFID encoder that encodes RFID tags at the RFID tag removal point, comprising:
   an RFID interrogator means;
   a plurality of programmable RFID tags attached to a conveyance web, the RFID tags contained within a protective enclosure which selectively mounts to the RFID encoder;
   a peel plate forcing a programmable RFID tag to partially peel away from the conveyance web thereby creating a spatial separation between the programmable tag and other programmable tags on the web, at which point the spatially separated programmable RFID tag undergoes encoding and verification by the interrogator means; and
   a motor means for positioning the spatially separated programmable RFID tag at a position that results in a good impedance match to the RFID interrogator means for encoding and verification, the motor means further adapted to enable the peel plate to remove the conveyance web from the impedance-matched tag.

2. The RFID encoder of claim 1 further comprising an optical sensor used to assist the motor means in positioning a programmable RFID tag for encoding and verification by the interrogator means.

3. The RFID encoder of claim 1 further comprising a near field coupler means for encoding the spatially separated programmable RFID tags.

4. The RFID encoder of claim 3, wherein the near field coupler means comprises a helical coil for encoding the spatially separated programmable RFID tags.

* * * * *